United States Patent [19]
Sugimura et al.

[11] Patent Number: 6,115,759
[45] Date of Patent: Sep. 5, 2000

[54] SYSTEM FOR DISPLAYING DESIRED PORTIONS OF A SPREADSHEET ON A DISPLAY SCREEN BY ADJOINING THE DESIRED PORTIONS WITHOUT THE NEED FOR INCREASING THE MEMORY CAPACITY

[75] Inventors: Kazumi Sugimura, Higashiosaka; Shuzo Kugimiya, Nara, both of Japan

[73] Assignee: Sharp Kabushiki Kaisha, Osaka, Japan

[21] Appl. No.: 09/025,787

[22] Filed: Feb. 19, 1998

[30] Foreign Application Priority Data

Jun. 6, 1997 [JP] Japan ................................. 9-149688

[51] Int. Cl.[7] .................................................. G06F 13/14
[52] U.S. Cl. ............................ 710/52; 709/200; 709/218; 709/217; 709/232; 709/233
[58] Field of Search ........................ 710/1, 52; 709/200, 709/201, 202, 203, 217, 218, 232, 233

[56] References Cited

U.S. PATENT DOCUMENTS 5,255,356  10/1993  Michelman et al. ..................... 707/504
5,307,295  4/1994  Taylor et al. ............................. 364/578
5,890,174  3/1999  Khanna et al. .......................... 707/504

FOREIGN PATENT DOCUMENTS 9-44328  2/1997  Japan .

Primary Examiner—Thomas C. Lee
Assistant Examiner—Abdelmoniem Elamin

[57] ABSTRACT

A data processing apparatus includes a spreadsheet data storing section for storing spreadsheet data, a spreadsheet creating section for creating a spreadsheet consisting of at least one row and at least one column and a display section for displaying the spreadsheet on a screen. Additionally, the data processing apparatus includes an inputting section for designating a row or a column to be subjected to a non-display operation, a non-display controlling section for removing row or column data in the non-display operation, and controlling the display section to display a modified spreadsheet by moving rows or columns previously located adjacent to the removed row or column into adjoining relation. Further, a recovery display controlling section enables the restoring of data of a previously removed row or column to the displayed spreadsheet when the inputting section designates implementation of a recovery display operation.

15 Claims, 14 Drawing Sheets

FIG. 3

| | T1 | T2 | T3 | T4 | T5 | T6 | T7 | T8 | T9 | T10 | T11 | T12 |
|---|---|---|---|---|---|---|---|---|---|---|---|---|
| | MODEL | SHIPPING PRICE(¥) | STANDARD PRICE(¥) | SELLING PRICE(¥) | DESTINATION | | SALES RECORD (NUMBER, SALES (×¥1,000)) | | | | | |
| | | | | | | | ('90) | ('91) | ('92) | ('93) | ('94) | SUM |
| Y01 | | | | | | | | | | | | |
| Y02 | | | | | | | | | | | | |
| Y03 | | | | | | | | | | | | |
| Y04 | X1000JP | 4,600 | 13,500 | 9,450 | DOMESTIC | NUMBER | 250 | 12,645 | 35,517 | 57,500 | 24,981 | 130,893 |
| Y05 | | | | | | SALES | 2,963 | 149,856 | 420,912 | 681,423 | 296,050 | 1,551,213 |
| Y06 | X1000US | 4,700 | 14,400 | 10,800 | US,NORTH AMERICA | NUMBER | 100 | 5,308 | 11,304 | 38,390 | 6,882 | 54,984 |
| Y07 | | | | | | SALES | 1,285 | 68,213 | 145,268 | 364,840 | 88,441 | 668,046 |
| Y08 | X1000EU | 4,800 | 14,900 | 11,920 | EUROPE, EAST EUROPE | NUMBER | 50 | 2,094 | 46,018 | 27,886 | 6,000 | 82,048 |
| Y09 | | | | | | SALES | 648 | 27,119 | 595,979 | 361,152 | 77,706 | 1,062,604 |
| Y10 | X1500JP | 7,800 | 21,000 | 14,700 | DOMESTIC | NUMBER | 580 | 1,099 | 3,863 | 7,000 | 398 | 12,940 |
| Y11 | | | | | | SALES | 10,992 | 20,827 | 73,208 | 132,657 | 7,542 | 245,226 |
| Y12 | X1500US | 7,850 | 22,500 | 16,875 | US,NORTH AMERICA | NUMBER | 230 | 14,328 | 38,619 | 22,000 | 0 | 75,177 |
| Y13 | | | | | | SALES | 4,589 | 285,858 | 770,488 | 438,922 | 0 | 1,499,856 |
| Y14 | X1500EU | 7,960 | 23,200 | 18,560 | EUROPE, EAST EUROPE | NUMBER | 80 | 8,549 | 15,666 | 4,000 | 0 | 28,295 |
| Y15 | | | | | | SALES | 1,604 | 171,416 | 314,119 | 80,204 | 0 | 567,343 |
| Y16 | X2000JP | 9,400 | 28,100 | 19,670 | DOMESTIC | NUMBER | 0 | 120 | 1,900 | 38,008 | 42,108 | 82,136 |
| Y17 | | | | | | SALES | 0 | 3,006 | 47,597 | 952,138 | 1,054,848 | 2,057,589 |
| Y18 | X2000US | 12,000 | 28,800 | 21,600 | US,NORTH AMERICA | NUMBER | 0 | 596 | 1,708 | 29,000 | 24,521 | 55,825 |
| Y19 | | | | | | SALES | 0 | 15,288 | 43,812 | 743,879 | 628,988 | 1,431,967 |
| Y20 | X3000JP | 12,200 | 35,400 | 24,780 | DOMESTIC | NUMBER | 0 | 4,762 | 6,631 | 9,339 | 6,054 | 26,786 |
| Y21 | | | | | | SALES | 0 | 155,484 | 216,509 | 304,928 | 197,669 | 874,590 |
| Y22 | X3000US | 18,200 | 36,200 | 27,150 | US,NORTH AMERICA | NUMBER | 0 | 2,025 | 2,844 | 1,350 | 2,534 | 8,753 |
| Y23 | | | | | | SALES | 0 | 66,523 | 93,428 | 44,349 | 83,244 | 287,545 |
| Y24 | X5000JP | 18,200 | 53,000 | 37,590 | DOMESTIC | NUMBER | 0 | 2,520 | 4,407 | 5,712 | 8,817 | 21,456 |
| Y25 | | | | | | SALES | 0 | 107,985 | 188,844 | 244,765 | 377,817 | 919,411 |
| Y26 | X5000US | 18,450 | 53,000 | 40,425 | US,NORTH AMERICA | NUMBER | 0 | 1,056 | 2,047 | 2,780 | 3,412 | 9,295 |
| Y27 | | | | | | SALES | 0 | 46,307 | 89,763 | 121,906 | 149,620 | 407,595 |
| Y28 | X5000EU | 18,300 | 54,100 | 43,280 | EUROPE, EAST EUROPE | NUMBER | 0 | 1,011 | 1,797 | 3,811 | 1,080 | 7,729 |
| Y29 | | | | | | SALES | 0 | 46,355 | 82,394 | 176,114 | 49,519 | 354,382 |
| Y30 | X8000JP | 25,000 | 54,500 | 38,150 | DOMESTIC | NUMBER | 0 | 0 | 659 | 6,400 | 8,722 | 15,781 |
| Y31 | | | | | | SALES | 0 | 0 | 27,580 | 267,846 | 365,024 | 660,451 |
| Y32 | X8000US | 26,100 | 54,900 | 41,175 | US,NORTH AMERICA | NUMBER | 0 | 0 | 244 | 1,207 | 2,565 | 4,016 |
| Y33 | | | | | | SALES | 0 | 0 | 10,260 | 50,756 | 107,861 | 168,877 |
| Y34 | | | | | | | | | | | | |
| Y35 | SUM | | | | | NUMBER | 1,290 | 56,113 | 173,224 | 244,413 | 138,074 | 613,114 |
| Y36 | | | | | | SALES | 22,080 | 1,164,237 | 3,120,161 | 4,965,887 | 3,484,329 | 12,756,695 |

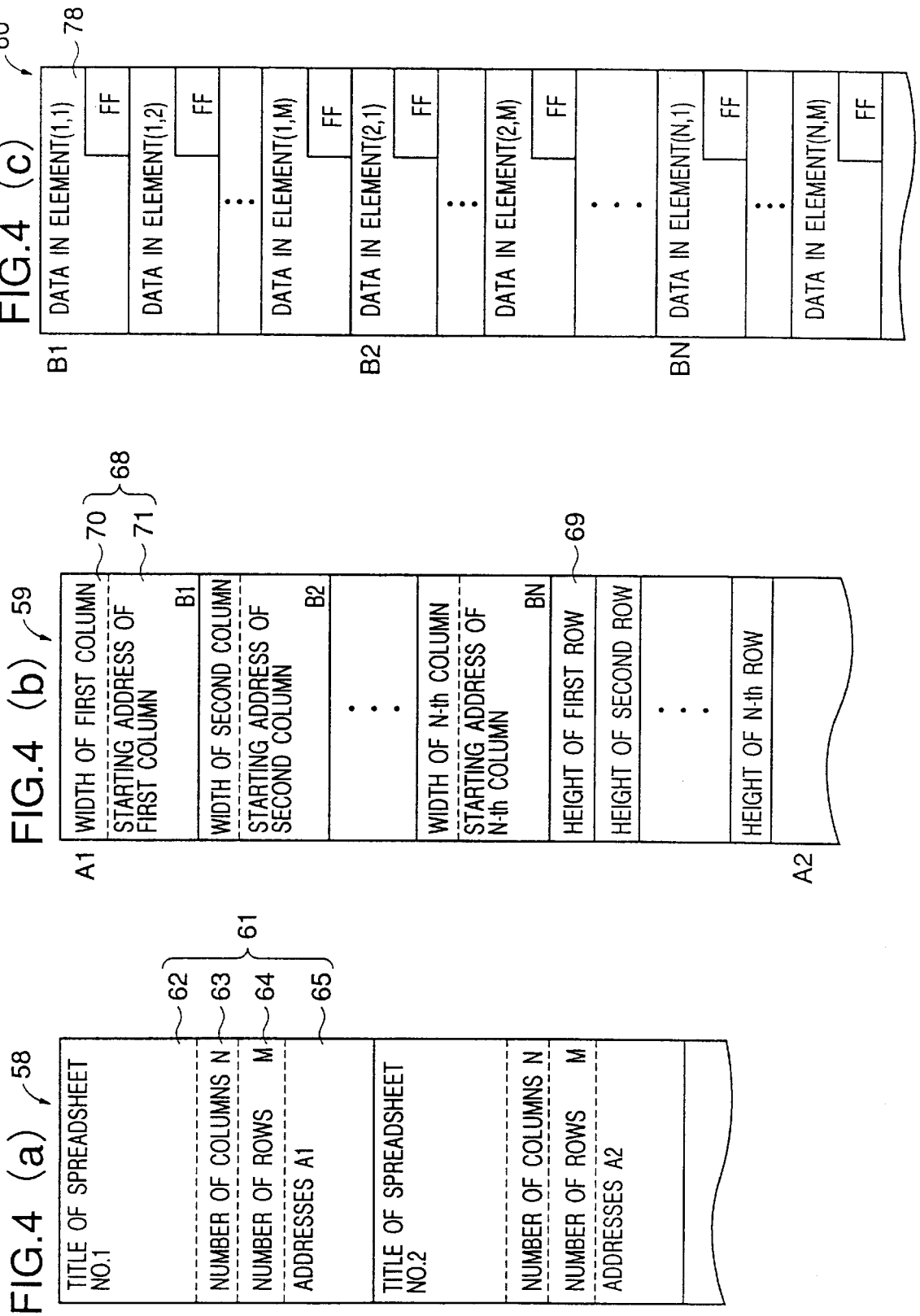

FIG. 9

| | T2 | T3 | T4 | T5 | T6 | T7 | T8 | T9 | |
|---|---|---|---|---|---|---|---|---|---|
| Y01 | | | | | | | SALES RECORD | | |
| Y02 | SHIPPING | STANDARD | SELLING | DESTINATION | | ('90) | ('91) | ('92) | ('93) |
| Y03 | PRICE(¥) | PRICE(¥) | PRICE(¥) | | | | | | |
| Y04 | 4,600 | 13,500 | 9,450 | DOMESTIC | NUMBER | 250 | 12,645 | 35,517 | 5 |
| Y05 | | | | | SALES | 2,963 | 149,856 | 420,912 | 68 |
| Y06 | 4,700 | 14,400 | 10,800 | US,NORTH | NUMBER | 100 | 5,308 | 11,304 | 38 |
| Y07 | | | | AMERICA | SALES | 1,285 | 68,213 | 145,268 | 364 |
| Y08 | 4,800 | 14,900 | 11,920 | EUROPE, | NUMBER | 50 | 2,094 | 46,018 | 2 |
| Y09 | | | | EAST EUROPE | SALES | 648 | 27,119 | 595,979 | 36 |
| Y10 | 7,800 | 21,000 | 14,700 | DOMESTIC | NUMBER | 580 | 1,099 | 3,863 | 13 |
| Y11 | | | | | SALES | 10,992 | 20,827 | 73,208 | |
| Y12 | 7,850 | 22,500 | 16,875 | US,NORTH | NUMBER | 230 | 14,328 | 38,619 | 22 |
| Y13 | | | | AMERICA | SALES | 4,589 | 285,858 | 770,488 | 438 |
| Y14 | 7,900 | 23,200 | 18,560 | EUROPE, | NUMBER | 80 | 8,549 | 15,666 | 80 |
| Y15 | | | | EAST EUROPE | SALES | 1,604 | 171,416 | 314,119 | |
| Y16 | 9,400 | 28,100 | 19,670 | DOMESTIC | NUMBER | 0 | 120 | 1,900 | 3 |
| Y17 | | | | | SALES | 0 | 3,006 | 47,597 | 9 |
| Y18 | 12,000 | 28,800 | 21,600 | US,NORTH | NUMBER | 0 | 596 | 1,708 | |

SYSTEM FOR DISPLAYING DESIRED PORTIONS OF A SPREADSHEET ON A DISPLAY SCREEN BY ADJOINING THE DESIRED PORTIONS WITHOUT THE NEED FOR INCREASING THE MEMORY CAPACITY

CROSS-REFERENCE TO RELATED APPLICATION

This application is related to Japanese application No. Hei 9(1997)-149688, filed on Jun. 6, 1997, whose priority is claimed under 35 USC §119, the disclosure of which is incorporated by reference in its entirety.

BACKGROUND OF THE INVENTION

1. Field of the Invention

The present invention relates to a data processing apparatus and a storage medium containing therein a program for controlling the data processing apparatus. More particularly, the invention relates to a data processing apparatus and a storage medium containing a program for controlling the data processing apparatus, which are applied to a small size electronic device such as an electronic notebook or a portable information terminal and adapted to modify a spreadsheet displayed on a display screen by re-arranging columns or rows in the spreadsheet and re-display the modified spreadsheet on the display screen.

2. Description of the Prior Art

Data processing apparatuses and data processing programs are conventionally known which are adapted to display and process data in a spreadsheet form in small size electronic devices such as electronic notebooks and portable information terminals and in application software for use in personal computers. The data processing apparatuses and programs have a spreadsheet creation function for creating a spreadsheet to record and display character string data in a tabular form and a spreadsheet computation function for computing the character string data recorded in the spreadsheet.

The spreadsheet used in the data processing apparatuses has a plurality of rectangular cells consecutively arranged in a matrix form. Data such as character string data to be recorded are displayed in the respective cells in the spreadsheet. A vertical alignment of plural cells is referred to as "column", while a horizontal alignment of plural cells is referred to as "row".

Most of the data processing apparatuses for use in the small size electronic devices stores therein a spreadsheet having a plurality of rectangular cells preliminarily arranged in a matrix form. The cells in the spreadsheet are separated from each other, for example, by frames defined by grid lines. This makes it easy to visually check the sizes of the respective cells. A user of such a data processing apparatus inputs data such as numeric data, formulas and character data to display the data in cells of the spreadsheet. The user can perform deleting, copying and pasting operations on a row or column basis to edit the data displayed in a spreadsheet form.

A data processing technique for the conventional small size electronic device has been proposed which is adapted to divide a spreadsheet into a plurality of spreadsheet portions so that any desired spreadsheet portions can selectively be displayed within a display area of a display screen if the spreadsheet is larger than the display area of the display screen.

Japanese Unexamined Patent Publication No. Hei 9(1997)-44328 discloses a data processing technique for modifying a spreadsheet by temporarily deleting a column or row in the spreadsheet and recovering the deleted column or row to ensure easy viewing of any desired spreadsheet portions.

More specifically, data to be stored in a spreadsheet data section are displayed in a spreadsheet form on a display section of an electronic device. When deletion of a column or row of the spreadsheet is designated by operating a coordinates inputting section, the spreadsheet is modified by temporarily deleting the column or row and bringing columns or rows adjacent to the deleted column or row in an adjoining relation, and the modified spreadsheet is displayed. At the same time, an identifier is displayed in a position where the deleted column or row has been present. Whether or not the identifier is to be displayed is determined by a user.

Further, when a portion of the coordinates inputting section corresponding to the position of the identifier is touched, the deleted column or row is recovered so as to be displayed in the original position. Where a plurality of columns have been deleted, any of the deleted columns can be recovered by selectively designating the deleted columns. The selective designation of the columns may be achieved by touching portions of the coordinates inputting section corresponding to the positions of identifiers displayed on a menu screen.

In general, the spreadsheet is created regardless of the limited size of the display area of a display screen of a small size electronic device or a personal computer which includes the data processing apparatus. If the created spreadsheet is larger than the display area of the display screen of the electronic device so that a portion of the spreadsheet desired to be viewed is not present within the display area, troublesome operations are required for viewing the desired spreadsheet portion. More specifically, scrolling of the desired spreadsheet portion into the display area, division of the spreadsheet and deletion of an unnecessary portion of the spreadsheet are required.

Particularly where data desired to be compared with each other are located in remote cells in the spreadsheet consisting of multiple rows and columns, the cells to be viewed should respectively be moved into the display area of the display screen so that the comparison of the data in the cells is difficult.

In accordance with the art disclosed in Japanese Unexamined Patent Publication No. Hei 9(1997)-44328, rows or columns are temporarily deleted with the positions thereof marked with identifiers to display the data desired to be compared with each other in an adjoining relation for easy comparison of data in remote cells in a spreadsheet consisting of multiple rows and columns. As required, the temporarily deleted rows or columns can thereafter be recovered to be displayed as they were. However, this operation requires not only a display buffer for storing therein the spreadsheet data to be displayed but also a temporary buffer for storing therein data in the deleted rows or columns for data read-in and read-out, thereby requiring a greater memory capacity and a greater data processing time before re-display of the data. Further, the data processing apparatus is not designed to change a row height or a column width when the deleted rows or columns are recovered to be displayed, thereby failing to ensure easy viewing of the data in the spreadsheet.

SUMMARY OF THE INVENTION

In view of the foregoing, the present invention provides a data processing apparatus and a storage medium containing therein a program for controlling the data processing apparatus, which are adapted to display only desired portions of a spreadsheet on a display screen by bringing the desired spreadsheet portions into an adjoining relation, if the spreadsheet is larger than the display area of the display screen, without the need for increasing the memory capacity thereof.

In accordance with the present invention, there is provided a data processing apparatus which comprise: a spreadsheet data storing section for storing therein spreadsheet data to be displayed in a tabular form; a spreadsheet creating section for reading the spreadsheet data out of the spreadsheet data storing section and creating a spreadsheet consisting of one or more rows and one or more columns; a display section for displaying the created spreadsheet on a display screen thereof; an inputting section for designating a row or column of the spreadsheet which is to be subjected to a non-display operation so as not to be displayed on the display section; a non-display controlling section for subjecting data of the designated row or column to the non-display operation, and controlling the display section to display a spreadsheet modified by bringing rows or columns previously located adjacent to the row or column subjected to the non-display operation into an adjoining relation; and a recovery display controlling section for controlling the display section to display a spreadsheet modified by restoring the data of the row or column subjected to the non-display operation in the spreadsheet data when the inputting section designates implementation of a recovery display operation on the data of the row or column subjected to the non-display operation.

BRIEF DESCRIPTION OF THE DRAWINGS

FIG. 3 is a diagram illustrating spreadsheet data stored in a spreadsheet data section 38 shown in FIG. 2;

FIGS. 4(a) to 4(c) are diagrams illustrating the memory configuration of the spreadsheet data section 38 shown in FIG. 2;

FIG. 9 is a diagram illustrating a screen image 96 of a spreadsheet 50 of FIG. 3 displayed on a display screen of a display section 2;

FIG. 15 is a diagram illustrating a screen image 104 which is displayed when implementation of a row recovery operation is designated for recovery of the rows subjected to the non-display operation in the screen image 103 shown in FIG. 14;

FIG. 16 is a diagram illustrating a row height changing operation screen 115 according to the embodiment;

FIG. 17 is a diagram illustrating a row selecting operation screen 124 according to the embodiment;

DETAILED DESCRIPTION OF THE PREFERRED EMBODIMENTS

Figure 1:
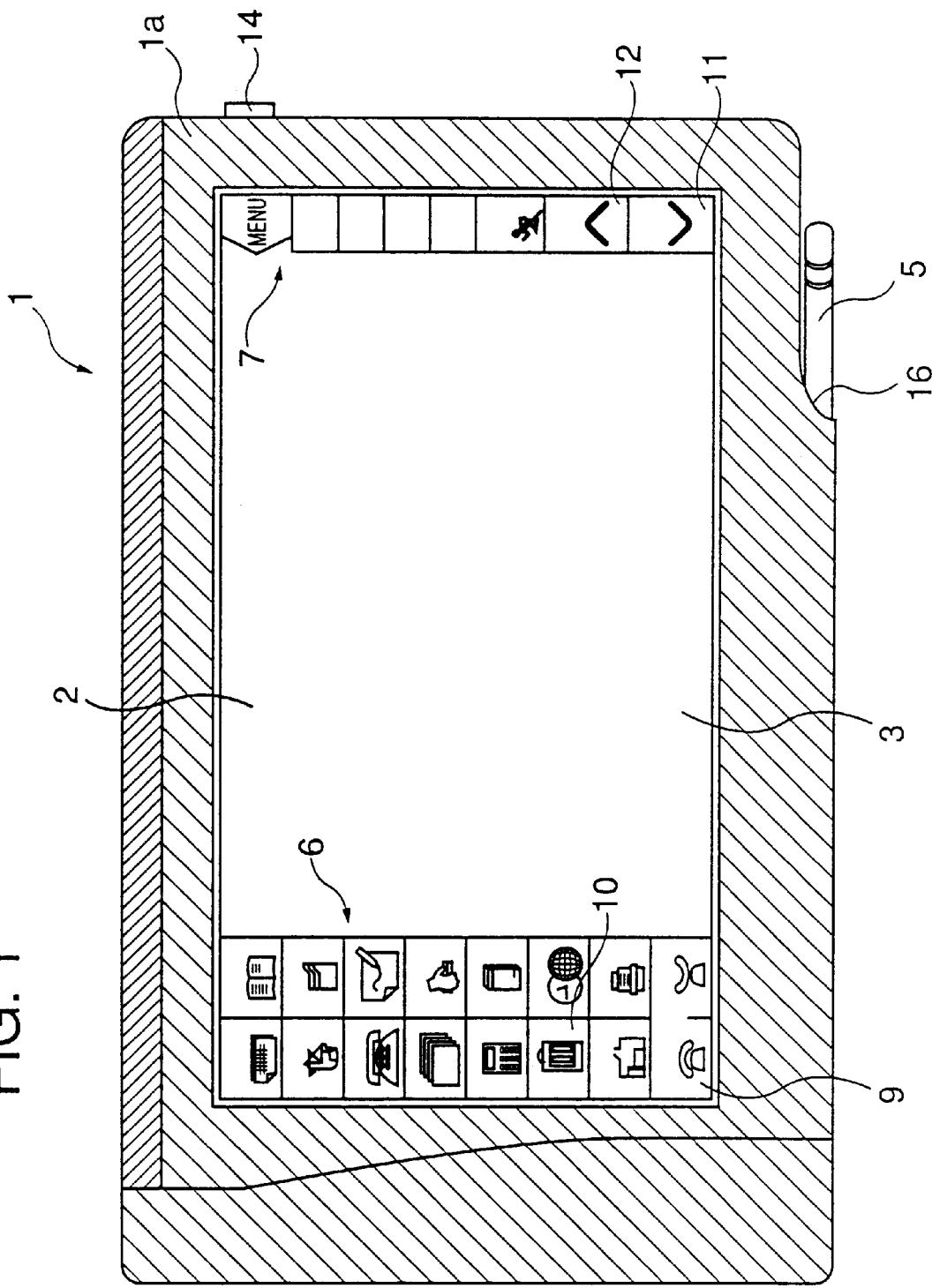
FIG. 1 is a diagram illustrating the appearance of an electronic device to which the present invention is applied.

The data processing apparatus according to the present invention comprises: a spreadsheet data storing section for storing therein spreadsheet data to be displayed in a tabular form; a spreadsheet creating section for reading the spreadsheet data out of the spreadsheet data storing section and creating a spreadsheet consisting of one or more rows and one or more columns; a display section for displaying the created spreadsheet on a display screen thereof; an inputting section for designating a row or column of the spreadsheet which is to be subjected to a non-display operation so as not to be displayed on the display section; a non-display controlling section for subjecting data of the designated row or column to the non-display operation, and controlling the display section to display a spreadsheet modified by bringing rows or columns previously located adjacent to the row or column subjected to the non-display operation into an adjoining relation; and a recovery display controlling section for controlling the display section to display a spreadsheet modified by restoring the data of the row or column subjected to the non-display operation in the spreadsheet data when the inputting section designates implementation of a recovery display operation on the data of the row or column subjected to the non-display operation.

In the present invention, the spreadsheet creating section, the non-display controlling section and the recovery display controlling section may be comprised of a microprocessor including a CPU, a ROM, a RAM and I/O ports. The spreadsheet data storing section may be comprised of a RAM. The display section comprises a liquid crystal circuit and an LCD display. The inputting section comprises a pen, a display screen and a transparent tablet integrally formed on the display screen.

In accordance with the present invention, if the created spreadsheet is larger than a display area of the display screen, only desired portions of the spreadsheet can be displayed on the display screen by bringing the desired spreadsheet portions into an adjoining relation. Since the data of the designated row or column is subjected to the non-display operation to bring the rows or columns adjacent to the designated row or column into an adjoining relation, there is no need to provide a temporary buffer which may otherwise be required for read-in and read-out of data recorded in a deleted row or column. This shortens the data processing time for re-displaying the modified spreadsheet and does not require a greater memory capacity.

The non-display controlling section is preferably designed such that, when the row or column to be subjected to the non-display operation is designated by the inputting section, the height of the designated row or the width of the designated column is set to zero for the non-display operation.

With this arrangement, the desired spreadsheet portions are brought into an adjoining relation for the non-display operation by setting the height of the designated row or the width of the designated column to zero. Therefore, there is no need to provide a temporary buffer for read-in and read-out of the data in the row or column subjected to the non-display operation. This shortens the data processing time for re-displaying the modified spreadsheet and does not require a greater memory capacity.

The data processing apparatus may further include a list buffer for storing therein a list of positional information indicative of positions of rows or columns subjected to the non-display operation by the non-display controlling section on a row or column basis. In this case, the inputting section is preferably adapted to select a row or column to be subjected to the recovery display operation from the list of the positional information of the rows or columns previously subjected to the non-display operation when the list is read out of the list buffer and displayed on the display section.

With this arrangement, even if a grid line cannot be dragged and dropped because the row height or the column width is reduced to zero, the numbers of columns having a width of zero or the numbers of rows having a height of zero are listed for designation of any of the row numbers or the column numbers so that the row height and the column width can readily be restored or changed.

The positional information to be listed may be expressed by Arabic numerals, alphabetic characters and Greek numerals.

The recovery display controlling section is preferably designed such that, when a row or column to be subjected to the recovery display operation and a numeric value for the height of the row or the width of the column are designated by the inputting section, the designated row or column is recovered with the height or width thereof being set to the designated numeric value.

With this arrangement, when the rows or columns subjected to the non-display operation are to be selectively recovered, the row height or the column width can be changed to ensure easy viewing of the spreadsheet information.

The present invention will hereinafter be described in detail by way of embodiments thereof with reference to the attached drawings. It should be understood that the invention be not limited to the embodiments. The data processing apparatus according to the present invention is applied to electronic devices such as electronic notebooks and portable information terminals.

FIG. 1 is a diagram illustrating the appearance of an electronic device to which the present invention is applied. In FIG. 1, there is shown a main body 1 of an electronic device such as an electronic notebook or a portable information terminal, which has a telephone directory management function, a schedule management function, a character string storing and editing function and the like.

Exemplary characters to be processed in the electronic device include Japanese Hiragana, Katakana and Kanji characters, alphabets, numerals, symbols and pictorial symbols. The character string herein means a string of plural characters.

The main body 1 includes a display section 2 and a coordinates inputting section 3. The display section 2 comprises a liquid crystal display, for example. The coordinates inputting section 3 comprises a transparent touch panel called "tablet". The coordinates inputting section 3 is provided on a display screen of the display section 2 in contact therewith, and adapted to sense coordinates indicative of the position of a portion of the coordinates inputting section 3 touched with a pen or a finger by a user or a trail of the pen or the finger resulting from dragging and dropping on the surface of the coordinates inputting section 3.

Usable as the tablet of the coordinates inputting section 3 in the present invention are touch panels of resistor film type, capacitance type, optical type and ultrasonic type.

The construction of the tablet employing, for example, a touch panel of resistor film type will hereinafter be described. The touch panel of resistor film type includes a pair of transparent glass substrates or transparent film substrates and a pair of transparent thin film electrodes respectively formed of a transparent conductive material on the substrates. In the touch panel, the transparent electrodes on the substrates are opposed to each other, and insulative dot spacers are provided on either one of the opposed surfaces of the substrates to prevent the pair of transparent electrodes from being brought in contact with each other under ordinary conditions.

When a portion of the touch panel is depressed, portions of the transparent thin film electrodes are brought in contact with each other. The contact between the transparent electrodes is utilized to determine the position of the touched portion. In general, resistor film type touch panels are classified into two types, i.e., a digital resistor film type and an analog resistor film type, depending on their position sensing methods.

In the touch panel of digital resistor film type, the pair of transparent thin film electrodes each include a plurality of transparent elongate electrode strips obtained by patterning a transparent conductive thin film. The transparent elongate electrode strips formed on one substrate extend perpendicularly to the transparent elongate electrode strips formed on the other substrate. When a portion of the touch panel where a transparent electrode strip on the one substrate intersects a transparent electrode strip on the other substrate is depressed, these electrode strips are brought into contact with each other, so that an electrical connection is established. The position of the depressed portion of the touch panel is determined by sensing the position of the electrical connection.

In the touch panel of analog resistor film type, the pair of transparent plain thin film electrodes respectively formed of a transparent conductive material on the film substrates are provided in an opposed relation. When a portion of the touch panel is depressed, portions of the transparent electrodes are brought in contact with each other. The position of the depressed portion of the touch panel is determined by sensing a potential gradient resulting from the contact between the transparent electrodes.

Where the display section 2 comprises an liquid crystal display, for example, the coordinates input may be achieved by utilizing some components of the liquid crystal display. The liquid crystal display comprises a pair of substrates, row electrodes provided on one of the substrates and column electrodes provided on the other substrate. The substrates are opposed to each other with a liquid crystal as a dielectric substance sandwiched therebetween and with the row electrodes extending perpendicularly to the column electrodes.

Pixels of the liquid crystal display are defined at intersections of the row electrodes and the column electrodes.

A microelectric current flows between the row electrodes and the column electrodes in the touch panel. Therefore, when a user touches a pixel of the touch panel with a pen or the like, electrostatic coupling or dielectric coupling occurs in the touched pixel. An electric signal detected at this time is utilized for the coordinates input. Since the liquid crystal display controls the switching between a display operation performed by the display section 2 and a coordinates detecting operation performed by the coordinates inputting section 3 on the order of several microseconds, the display operation is apparently continuous.

The display section 2 displays a group of mode keys 6 and a group of function keys 7 on its display screen. The mode keys 6 are used to switch between a plurality of functions, such as a telephone directory management function, a schedule management function and a character string inputting and editing function, which can be performed in the electronic device. A spreadsheet processing mode key 10 for displaying and editing spreadsheet data in a tabular form is included in the mode key group 6. The function keys 7 are used to designate, for example, interruption of an operation of a particular function selected by operating one of the mode keys during the implementation of the operation. A forward scrolling key 11 and a backward scrolling key 12 for scrolling back and forth the data displayed on the display section 2 are included in the function key group 7.

The electronic device further includes a power switch 14 provided on a side wall 1a of the main body 1 thereof for turning on and off the power supply to the electronic device. When the power switch 14 is operated with the power supply being off, the power supply is switched on. Conversely, when the power switch 14 is operated with the power supply being on, the power supply is switched off.

A holder 16 for holding a pen 5 to be used for inputting coordinates to the coordinates inputting section 3 is also provided on the side wall 1a of the main body 1 of the electronic device.

Figure 2:
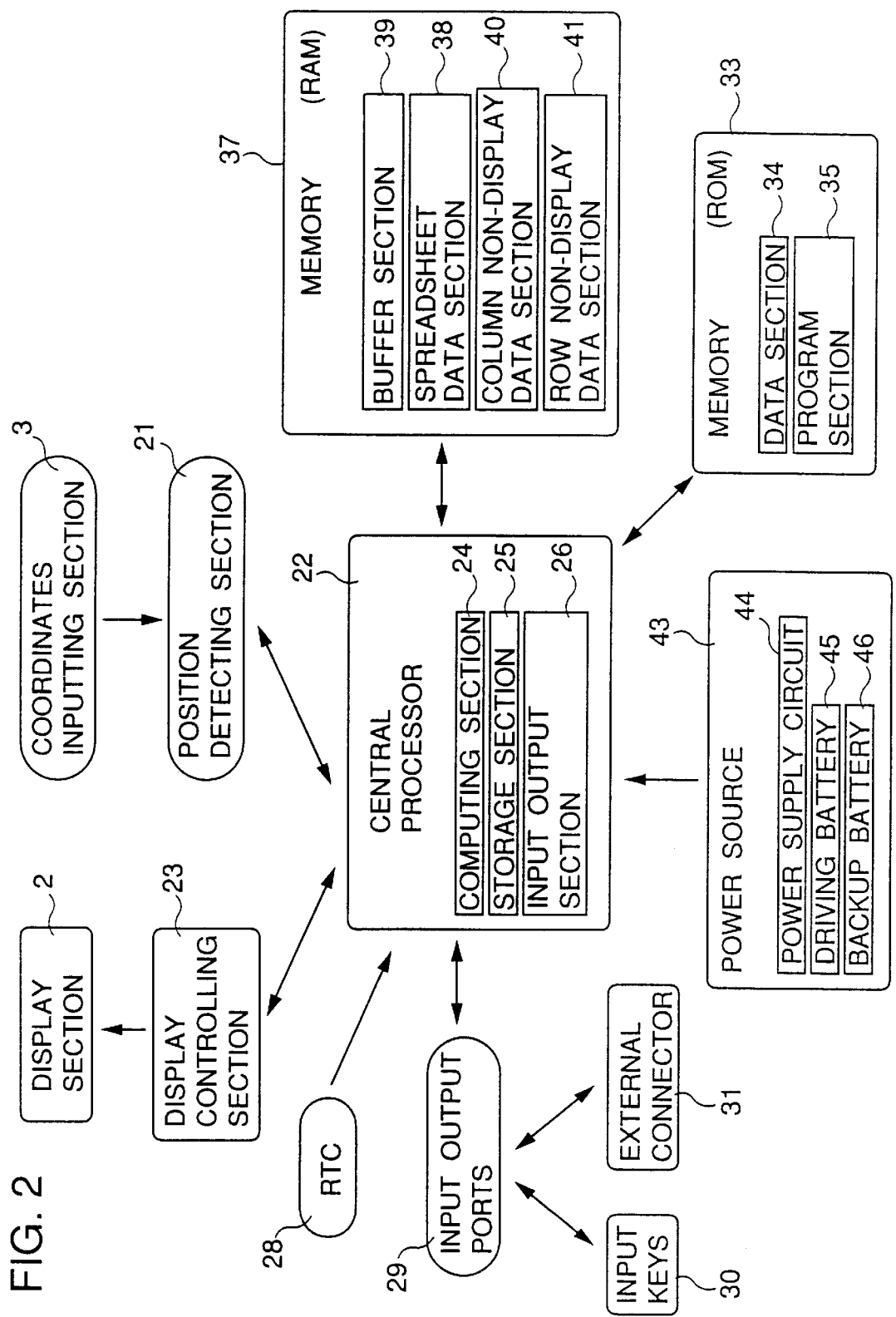
FIG. 2 is a block diagram illustrating the electrical construction of the electronic device shown in FIG. 1.

FIG. 2 is a block diagram illustrating the electrical construction of the electronic device shown in FIG. 1. Referring to FIG. 2, the electronic device comprises the display section 2, a display controlling section 23, the coordinates inputting section 3, a position detecting section 21, a central processor 22, an RTC (real time clock) 28, input output ports 29, input keys 30, an external connector 31, memories 33 and 37 and a power source 43.

The central processor 22 is comprised of a microprocessor including a CPU, a ROM, a RAM and I/O ports, and has a computing section 24, a storage section 25 (RAM), and an input output section (I/O ports) 26. The computing section 24 performs computation under the control of the central processor 22. The storage section 25 includes internal memories and registers for storing therein data to be used for the computation performed by the computing section 24 and computation results. The input output section 26 includes input output ports for receiving input and output to be applied to the central processor 22.

When the coordinates inputting section 3 is operated, for example, by depressing a portion thereof, the position detecting section 21 senses coordinates indicative of the position of an operated portion of the coordinates inputting section 3, and outputs the positional information to the central processor 22. The central processor 22 outputs image information and display controlling data to the display controlling section 23. The display controlling section 23 controls the display section 2 to display the image information on the basis of the display controlling data applied from the central processor 22.

The RTC 28 generates clock pulses for driving the CPU and generating time data, which are in turn applied to the central processor 22.

The input output ports 29 control the input keys 30 including the mode keys 6 and the function keys 7 shown in FIG. 1 on the basis of the output of the central processor 22. The output of any of the input keys 30 is applied to the central processor 22 via a corresponding input output port 29. Further, the input output ports 29 perform data transfer between another electronic device connected thereto via the external connector 31 and the central processor 22 of the electronic device.

The memory 33 is comprised of a ROM (read only memory), and includes a data section 34 and a program section 35. The data section 34 stores therein font data and graphic data to be used for displaying characters on the display section 2 and data such as a conversion dictionary data to be used for converting inputted Japanese Hiragana characters into Japanese Kanji characters. The program section 35 stores therein programs for performing functions corresponding to the respective mode keys 6 described above and programs for controlling the overall operation of the electronic device.

The memory 37 is comprised of a RAM (random access memory), and has memory areas functioning as a spreadsheet data section 38, a buffer section 39, a column non-display data section 40 and a row non-display data section 41.

The central processor 22 reads therein various data stored in the respective sections of the memories 33 and 37 in accordance with a control operation to be performed. The memory 33 temporarily stores therein data outputted from the central processor 22.

A power is supplied to the central processor 22 from the power source 43. The power source 43 includes a power supply circuit 44, a driving battery 45 and a backup battery 46. The driving battery 45 is a battery for driving the overall device. The backup battery 46 is a battery for retaining the data stored in the memory 37 and the storage section 25 of the central processor 22. The power supply circuit 44 adjusts the voltages of the batteries 45 and 46 to predetermined levels by voltage amplification and voltage division. Further, the power supply circuit 44 detects exhaustion of the batteries 45 and 46 for low-level battery check.

In accordance with the present invention, the data processing apparatus shown in FIG. 2 may be controlled by a computer program which is stored in a storage medium, e.g., a memory card such as of an EEPROM, a floppy disk, a hard disk, an MD or a CD-ROM, and used as a general purpose program in an external storage device. The storage medium according to the present invention contains therein the computer program for controlling the data processing apparatus having a spreadsheet data storing section for storing therein spreadsheet data to be displayed in a tabular form, a spreadsheet creating section for reading the spreadsheet data out of the spreadsheet data storing section and creating a spreadsheet consisting of one or more rows and one or more columns, and a display section for displaying the created spreadsheet on a display screen thereof, an inputting section designates a row or column of the spreadsheet which is to be subjected to a non-display operation so as not to be displayed on the display section, the computer program causing the computer to perform the functions of: subjecting data of the designated row or column to the non-display operation, and controlling the display section to display a spreadsheet modified by bringing rows or columns previously located adjacent to the row or column subjected to the non-display operation into an adjoining relation; and controlling the display section to display a spreadsheet modified by restoring the data of the row or column subjected to the non-display operation in the spreadsheet data when the inputting section designates implementation of a recovery display operation on the data of the row or column subjected to the non-display operation.

The spreadsheet data section 38 shown in FIG. 2 functions as the spreadsheet data storing section. The central processor 22 functions as the spreadsheet creating section. The coordinates inputting section 3 and the input keys 30 function as the inputting section.

FIG. 3 is a diagram illustrating spreadsheet data stored in the spreadsheet data section 38 shown in FIG. 2. Referring to FIG. 3, a spreadsheet 50 displayed on the display screen includes a plurality of areas 51 (one of which is indicated by a two-dot-and-dash line) arranged in a matrix form. The areas are each referred to as "element". Character strings of letters, numerals and symbols are displayed in the respective elements. A vertical alignment of plural elements is hereinafter referred to as "column", while a horizontal alignment of plural elements is hereinafter referred to as "row".

Columns and rows in the spreadsheet 50 include designation areas Tn (e.g., T1 to T12) and Yn (e.g., Y1 to Y36) used to designate the columns and rows in addition to the elements to which character strings are inputted. In FIG. 3, a column 55 designated by a designation area T2 and a row 56 designated by a designation area Y06 are indicated by diagonally shaded areas.

The spreadsheet 50 is divided into a plurality of rectangular portions by grid lines. The portions separated from each other by the grid lines are irrelevant to rows and columns to be designated. The separation of the portions with the grid lines facilitates visual check of relevant display data in the spreadsheet 50. Although some of the portions separated by the grid lines include a plurality of rows and columns, the designation of the rows and columns by the designation areas Tn and Yn is not influenced by the separation with the grid lines.

FIGS. 4(a) to 4(c) are diagrams illustrating memory configurations in the spreadsheet data section 38 shown in FIG. 2. FIG. 4(a) illustrates the memory configuration of a spreadsheet index section 58. FIG. 4(b) illustrates the memory configuration of a row and column data section 59. FIG. 4(c) illustrates the memory configuration of a spreadsheet actual data section 60.

The spreadsheet data section 38 comprises the spreadsheet index section 58, the row and column data section 59 and the spreadsheet actual data section 60 in which a plurality of hierarchically classified spreadsheet data are stored.

The spreadsheet index section 58 has a plurality of memory areas 61 respectively designated for a plurality of spreadsheets to be stored in the spreadsheet data section 38. Each of the memory areas 61 includes areas 62 to 65 each having a fixed length. The area 63 stores therein the number of columns in a spreadsheet. The area 64 stores therein the number of rows in the spreadsheet. The area 65 stores therein the starting addresses of row data and column data stored in areas of the row and column data section 59.

If the memory area 61 has a memory capacity of 28 bites, for example, the areas 62, 63, 64 and 65 have lengths of 20 bites, 2 bites, 2 bites and 4 bites, respectively. In this case, the number of columns and the number of rows can be counted up to 65,536 in the areas 63 and 64, respectively. In the area 65, addresses can be designated in the row and column data section 59 up to a memory capacity of 4 Gbites.

The row and column data section 59 stores therein various data including a column width and a row height. If the spreadsheet 50 in FIG. 3 consists of N columns and M rows, for example, the row and column data section 59 contains N memory areas 68 and M memory areas 69. The memory areas 68 are each divided into areas 70 and 71. The area 70 stores therein data concerning the column width. The area 71 stores therein a starting address of an area in which data concerning the first element in a particular column is stored within the spreadsheet actual data section 60.

The spreadsheet actual data section 60 stores therein character data of character strings to be displayed in the respective elements in the spreadsheet 50. In the spreadsheet 50, the elements are each specified by a column number and a row number to which the element belongs. For example, an element belonging to the second column and the sixth row is expressed as "element (2,6)".

The spreadsheet actual data section 60 includes (N×M) memory areas 78 for storing therein (N×M) data in the single spreadsheet 50. Data displayed in the elements are sequentially stored in the respective memory areas 78. For example, the display data are arranged in an ascending order of column numbers as a main arrangement order and in an ascending order of row numbers as an auxiliary arrangement order. More specifically, after data in elements from "element (1,1)" belonging to the first column and the first row to "element (1,M)" belonging to the first column and the M-th row are stored, data in "element (2,1)" belonging to the second column and the first row is stored in the spreadsheet actual data section 60. The memory areas 78 are variable-length areas, and a hexadecimal code "FF" is added as a separator to the end of data stored in each of the memory areas 78.

Figure 5:
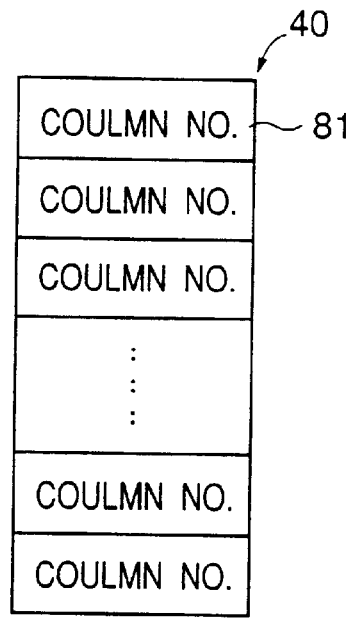
FIG. 5 is a diagram illustrating the memory configuration of a column non-display data section 40 shown in FIG. 2.
Figure 6:
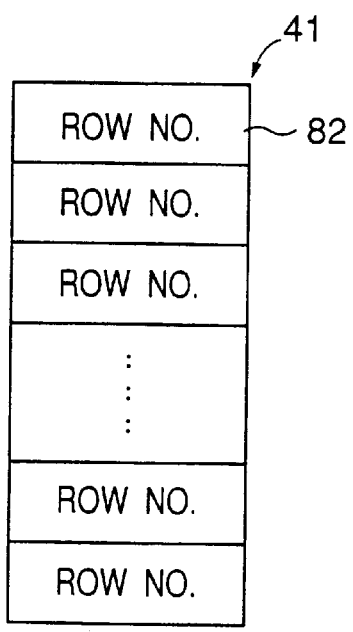
FIG. 6 is a diagram illustrating the memory configuration of a row non-display data section 41 shown in FIG. 2.

FIG. 5 is a diagram illustrating the memory configuration of the column non-display data section 40 shown in FIG. 2. FIG. 6 is a diagram illustrating the memory configuration of the row non-display data section 41 shown in FIG. 2.

In the present invention, when the spreadsheet 50 shown in FIG. 3 is displayed on the display screen, the width of a column or the height of a row can be reduced to zero for a non-display operation by dragging and dropping a grid line of the column or row of the spreadsheet 50, whereby the row or column is not displayed on the display screen. It is noted that a frame enclosing a column area or row area is herein referred to as "grid lines".

Referring to FIGS. 5 and 6, the column non-display data section 40 and the row non-display data section 41 respectively have memory areas 81 equal in number to columns (column numbers) subjected to the non-display operation and memory areas 82 equal in number to rows (row numbers) subjected to the non-display operation. The memory areas 81 and 82 are fixed-length areas.

Figure 7:
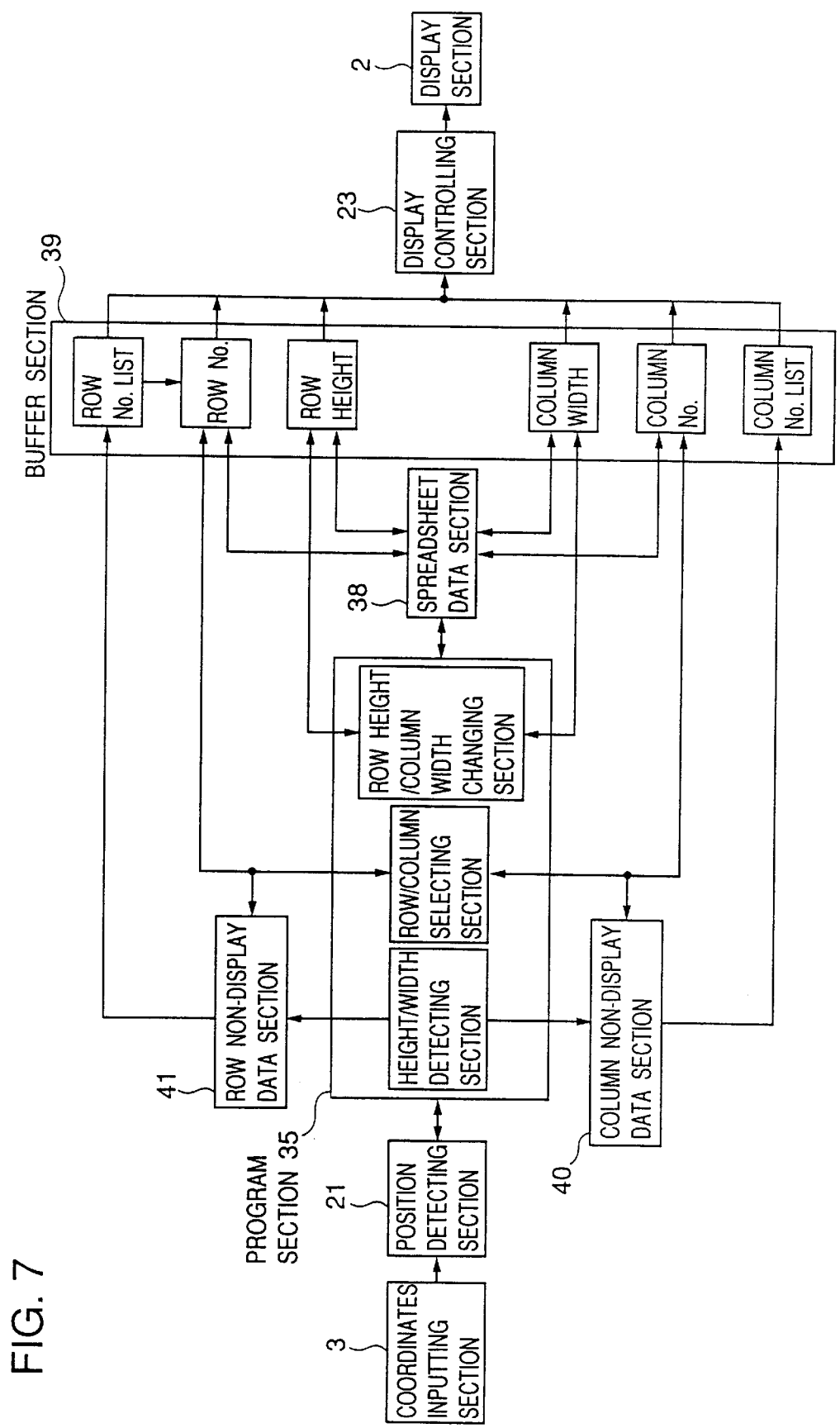
FIG. 7 is a block diagram illustrating the construction of an electronic device according to one embodiment of the present invention on a function basis.

FIG. 7 is a block diagram illustrating the construction of the electronic device according to this embodiment on a function basis. Referring to FIG. 7, when the position detecting section 21 detects positional information indicative of the position of the pen operated on the coordinates inputting section 3 and outputs the positional information to the central processor 22, the central processor 22 generates display controlling data and updated spreadsheet data by utilizing controlling functions of the program section 35

(including a height/width detecting section, a row/column selecting section, and a row height/column width changing section) comprised of the ROM and various data processing functions of the spreadsheet data section 38, the buffer section 39, the column non-display data section 40 and the row non-display data section 41 comprised of the RAM, and outputs the display controlling data and the updated spreadsheet data to the display controlling section 23. The display controlling section 23 controls the display section 2 on the basis of the display controlling data and displays an updated spreadsheet on the display screen.

More specifically, a row or column to be subjected to the non-display operation is selected from the preliminarily inputted spreadsheet data by the row/column selecting section, and spreadsheet data in the selected row or column are processed as non-display data in the buffer section 39, the column non-display data section 40 and the row non-display data section 41 on the basis of the programs stored in the height/width detecting section and the row height/column width changing section, and the non-display data are outputted to the display controlling section 23. The display controlling section 23 displays spreadsheet data modified by subjecting only the selected row or column to the non-display operation on the display screen of the display section 2.

When a row or column to be subjected to a recovery display operation is selected by the row/column selecting section to recover spreadsheet data previously subjected to the non-display operation, the spreadsheet data in the selected row or column are processed as recovery spreadsheet data in the height/width detecting section and the row height/column width changing section in the buffer section 39, the column non-display data section 40 and the row non-display data section 41 on the basis of programs stored, and the recovery spreadsheet data are outputted to the display controlling section 23. The display controlling section 23 displays spreadsheet data modified by restoring the recovery spreadsheet data of the selected row or column in their original positions on the display screen of the display section 2.

Figure 8:
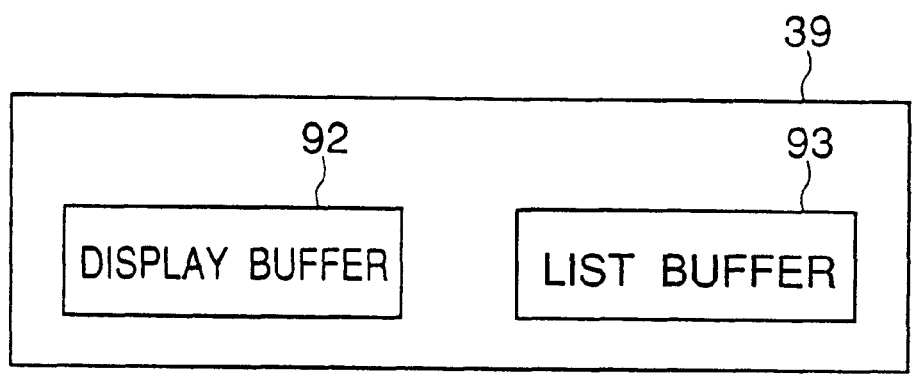
FIG. 8 is a diagram illustrating the memory configuration of a buffer section 39 shown in FIG. 2.

FIG. 8 is a diagram illustrating the memory configuration of the buffer section 39 shown in FIG. 2. Referring to FIG. 8, the buffer section 39 includes a display buffer 92 and a list buffer 93. The list buffer 93 stores therein data required for displaying a list of the numbers of rows each having a height of zero in a row height changing display screen and a list of the numbers of columns having a width of zero in a column width changing display screen in the row and column recovery display operations.

The display buffer 92 is a display memory for storing therein the entire display data of the spreadsheet to be displayed on the display screen. The display memory corresponds to a virtual display screen having a larger display area than the display area of the actual display screen of the display section 2 so as to display the entire spreadsheet 50 shown in FIG. 3, and stores therein spreadsheet data for displaying the entire spreadsheet 50 on the virtual display screen.

The spreadsheet data stored in the spreadsheet data section 38 of the memory 37 are generally compressed so that the data type thereof is different from that of the data to be displayed on the actual display screen. The display buffer 92 stores therein spreadsheet data in a form that permits the spreadsheet 50 to be displayed on the virtual display screen which is larger than the actual display screen. When a portion of the spreadsheet not displayed on the actual display screen is to be displayed on the display screen by scrolling the display screen, data processing can be performed more rapidly than in a case where the data in the spreadsheet data section 38 are decompressed when the display screen is scrolled.

In the present invention, the spreadsheet 50 to be displayed is created regardless of the limited size of the display screen of the display section 2. Therefore, the spreadsheet 50 may be larger than the display screen of the display section 2.

FIG. 9 is a diagram illustrating a screen image 96 of the spreadsheet 50 of FIG. 3 displayed on the display screen of the display section 2. Referring to FIG. 9, the screen image 96 includes a portion of the spreadsheet 50, an end button 98 and scroll buttons 99 and 100.

When the screen image 96 is displayed on the display screen of the display section 2, the positions of the end button 98 and the scroll buttons 99 and 100 correspond particular coordinates on the coordinates inputting section 3 provided above the display screen. More specifically, when coordinates inputted by the coordinates inputting section 3 correspond to the position of one of the buttons 98 to 100 in the screen image 96, it is determined that the corresponding one of the buttons 98 to 100 has been operated, and a processing operation corresponding to the operated button is performed. This means that areas on the coordinates inputting section 3 defined by the button images displayed on the display section 2 serve as input keys. When coordinates of one of the defined areas are detected, a function indicated by a button image displayed on the display section 2 just under the defined area is performed.

The positions of the buttons 98 to 100 as the input keys 30 defined by the combination of the button images on the display section 2 and the coordinates on the coordinates inputting section 3 can easily be changed by modifying a program for determining the correspondence between a button image and coordinates inputted on the coordinates inputting section 3. Particularly in a small size electronic device, such as an electronic notebook or a portable information terminal, which has a smaller display screen size, the limited display screen area of the display section can efficiently be used.

The screen image 96 has a smaller size than the spreadsheet 50 shown in FIG. 3. Therefore, the portion of the spreadsheet 50 contained in the screen image 96 does not include the 10th to 12th columns T10 to T12 and the 18th to 36th rows Y18 to Y36. Where the spreadsheet has a greater size than the actual display screen, the spreadsheet is displayed on the display screen with some portions thereof excluded.

If numeric values in the 2nd column are to be compared with numeric values in the 12th column in the spreadsheet 50 shown in FIG. 3, the comparison between the 2nd column and 12th column is generally carried out after a user scrolls the display screen and memorizes the numeric values in the 2nd and 12th columns.

In accordance with the present invention, however, the columns or rows desired to be compared with each other can be displayed on the display screen by subjecting the other columns or rows in the spreadsheet 50 to the non-display operation.

Figure 10:
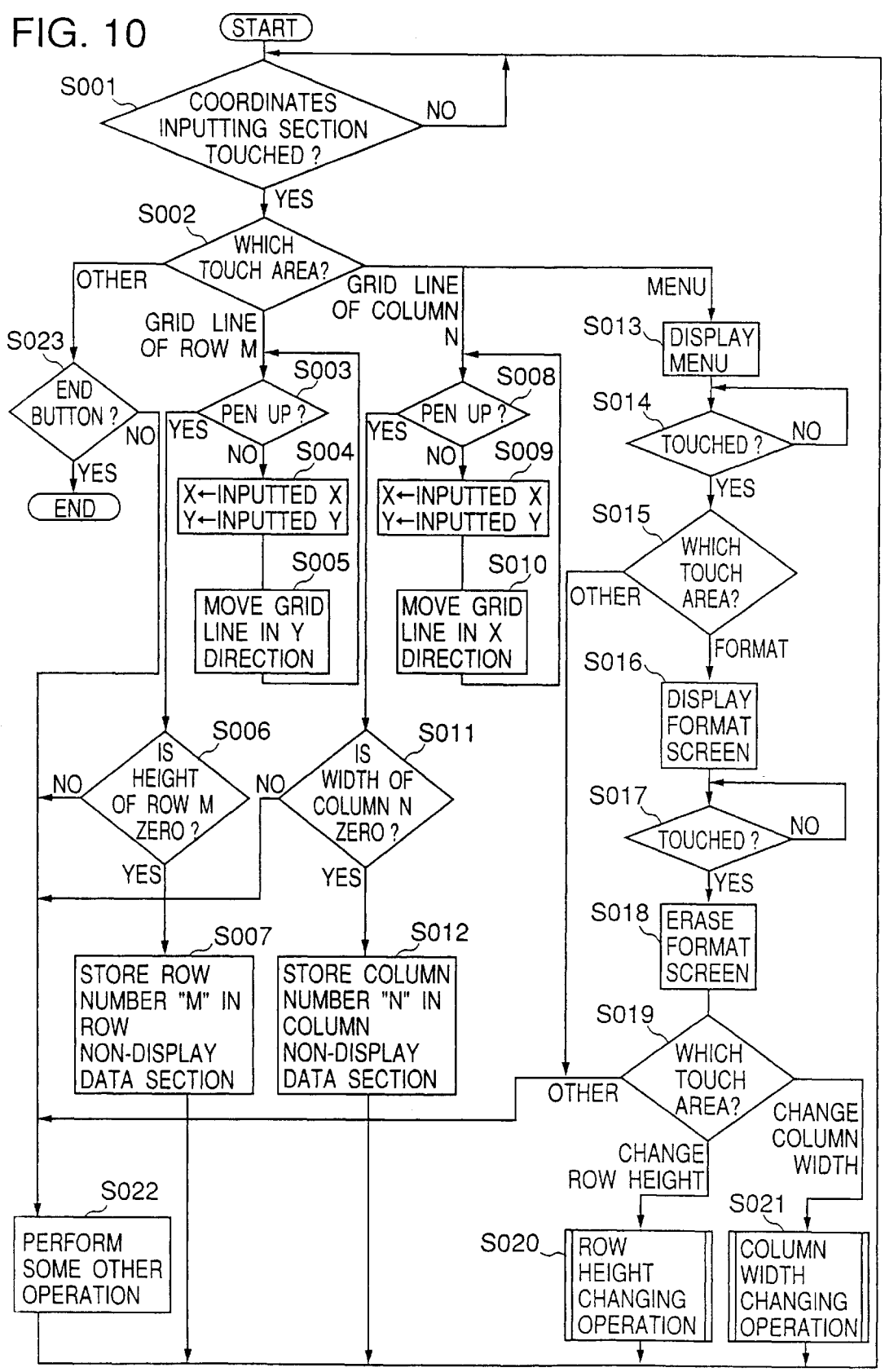
FIG. 10 is a flow chart illustrating a spreadsheet data displaying operation according to another embodiment.
Figure 13:
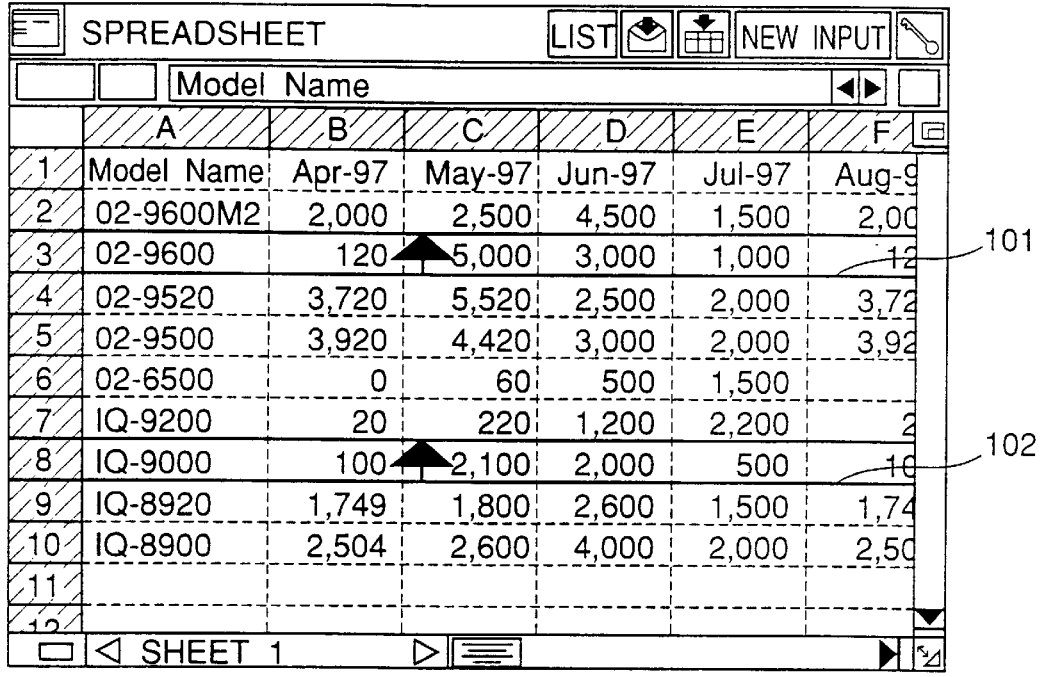
FIG. 13 is a diagram illustrating a screen image 100 for explaining a spreadsheet data displaying operation according to the embodiment.
Figure 14:
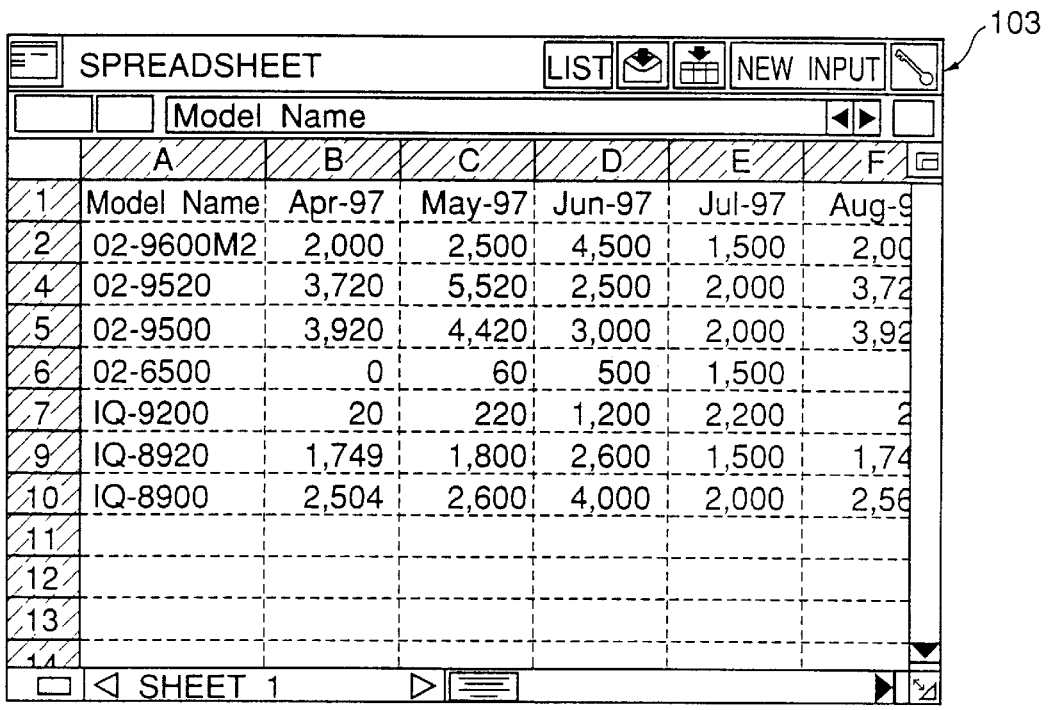
FIG. 14 is a diagram illustrating a screen image 103 which is displayed when rows No. 3 and No. 8 are omitted from the screen image 100 of FIG. 13 through a row non-display operation.

FIG. 10 is a flow chart illustrating various spreadsheet data processing operations according to another embodiment. FIG. 13 is a diagram illustrating a screen image 100 for explaining a spreadsheet data displaying operation according to this embodiment. FIG. 14 is a diagram illustrating a screen image 103 which is displayed when rows No. 3 to No. 8 are omitted from the screen image 100 of FIG. 13 through a row non-display operation.

Referring to FIG. 10, there will be described a process sequence in which a row or column is omitted from the screen image 100 of FIG. 13 through a row or column non-display operation by dragging and dropping a grid line of the row or column and, thereafter, the omitted row or column is displayed on the display screen through a row or column recovery operation.

An explanation will be given to a case where the heights of the rows are reduced to zero for the row non-display operation.

Step S001: It is judged whether or not an input of coordinates is applied to the coordinates inputting section 3. When a portion of the coordinates inputting section 3 is depressed with a pen, it is determined that an input is applied to the coordinates inputting section 3, and a subsequent operation is performed. If no coordinates input is applied, the process returns to Step S001. If a coordinates input is applied, the process goes to Step S002.

Step S002: The position detecting section 21 detects the coordinates inputted with the pen on the coordinates inputting section 3 as positional information. More specifically, the coordinates detected by the position detecting section 21 are applied to the central processor 22. The central processor 22 determines which image area in the screen image 100 displayed on the display screen corresponds to the inputted coordinates, on the basis of the data and programs stored in the memory 33 and image data stored in the display buffer 92 of the buffer section 39 of the memory 37.

In this embodiment, when a screen image is displayed on the display screen of the display section 2 and an input of coordinates is applied to the coordinates inputting section 3, it is determined that a particular image area in the screen image located just under the inputted coordinates on the coordinates inputting section 3 is selected.

Particular areas of the coordinates inputting section 3 located above particular image areas such as the buttons and the designation areas displayed on the display screen are defined as touch areas.

If the inputted coordinates belong to a touch area corresponding to a grid line of the M-th row, the process goes to Step S003. The M-th row is hereinafter referred to as "row No. M".

Step S003: It is determined whether or not the pen is brought away from the coordinates inputting section 3. If not so, the process goes to Step S004. If so, the process goes to Step S006.

Step S004: The coordinates (x,y) outputted from the position detecting section 21 are applied to the central processor 22.

Step S005: A grid line is moved in a Y direction.

The process sequence from Step S003 to Step S005 is repeated until the pen is brought away from the coordinates inputting section 3. When the pen is brought away from the coordinates inputting section 3, the process goes to Step S006.

Step S006: It is judged whether or not the height of the row No. M is zero. More specifically, if the position at which the pen is brought away from the coordinates inputting section 3 in Step S002 has a Y coordinate y1 and the row No. M-1 which is located immediately before the row No. M has a Y coordinate y2, the height of the row No. M is given by a difference y2-y1 between these two Y coordinates. If the difference y2-y1 is zero, the height of the row No. M is zero. This numeric value is stored in the row and column data section 59, and the display controlling section 23 controls the display screen of the display section 2 to display thereon a spreadsheet modified by subjecting the row No. M to the non-display operation. If the row height is not zero in Step S006, the process goes to Step S022 and, upon completion of some other operation, the process returns to Step S001. If the row height is zero, the process goes to Step S007.

Step S007: The row number "M" is stored in the row non-display data section 41, and the process returns to Step S001.

Thus, when the height of the row No. M is reduced to zero so that the row No. M is not displayed, the row number "M" is stored in the row non-display data section 41. Screen images displayed at this time are shown in FIGS. 13 and 14.

With the screen image 100 displayed as shown in FIG. 13, a grid line 101 of the row No. 3 is dragged and dropped so that the row No. 3 has a height of zero and a grid line 102 of the row No. 8 is dragged and dropped so that the row No. 8 has a height of zero.

Thus, the heights of the rows can be reduced to zero by dragging and dropping the lower grid lines of the rows. Similarly, the width of a column can be reduced to zero by dragging and dropping a right grid line of the column.

A screen image 103 shown in FIG. 14 is obtained by omitting the rows No. 3 and No. 8 from the screen image 100 of FIG. 13 through the non-display operation by dragging and dropping the grid lines of the rows. At this time, the row numbers "3" and "8" are stored in the row non-display data section 41.

Next, an explanation will be given to a case where the width of a column is reduced to zero for the column non-display operation.

Referring again to FIG. 10, if it is determined in Step S002 that the inputted coordinates belong to a touch area corresponding to a grid line of the N-th column, the process goes to Step S008. The N-th column is hereinafter referred to as "column No. N".

Step S008: It is determined whether or not the pen is brought away from the coordinates inputting section 3. If not so, the process goes to Step S009. If so, the process goes to Step S011.

Step S009: The positional information (x,y) outputted from the position detecting section 21 is applied to the central processor 22.

Step S010: A grid line is moved in an X direction.

The process sequence from Step S008 to Step S010 is repeated until the pen is brought away from the coordinates inputting section 3. When the pen is brought away from the coordinates inputting section 3, the process goes to Step S011.

Step S011: It is judged whether not the width of the column No. N is zero. More specifically, if the position at which the pen is brought away from the coordinates inputting section 3 in Step S008 has an X coordinate x1 and the column No. N-1 which is located immediately before the column No. N has an X coordinate x2, the width of the column No. N is given by a difference x2-x1 between these two X coordinates. When the difference x2-x1 is zero, the width of the column No. N is zero. This numeric value is stored in the row and column data section 59, and the display controlling section 23 controls the display screen of the display section 2 to display thereon a spreadsheet modified by subjecting the column No. N to the non-display operation. If the column width is not zero in Step S011, the process goes to Step S022 and, upon completion of some other operation, the process returns to Step S001. If the column width is zero, the process goes to Step S012.

Step S012: The column number "N" is stored in the column non-display data section 40, and the process returns to Step S001.

Thus, when the width of the column No. N is reduced to zero so that the column No. N is not displayed, the column number "N" is stored in the column non-display data section 40.

In this embodiment, the row or column subjected to the non-display operation can be recovered so as to be displayed in the original position on the display screen.

There will hereinafter be described a recovery display operation for recovering the rows subjected to the non-display operation with the screen image 103 of FIG. 14 displayed on the display screen in the electronic device shown in FIG. 1.

If it is determined that the inputted coordinates belong to a touch area corresponding to a menu button (the uppermost one of the function buttons 7 in FIG. 1) with the screen image 103 of FIG. 14 displayed on the display screen, the process goes to Step S013.

Figures 15, 16, 17:
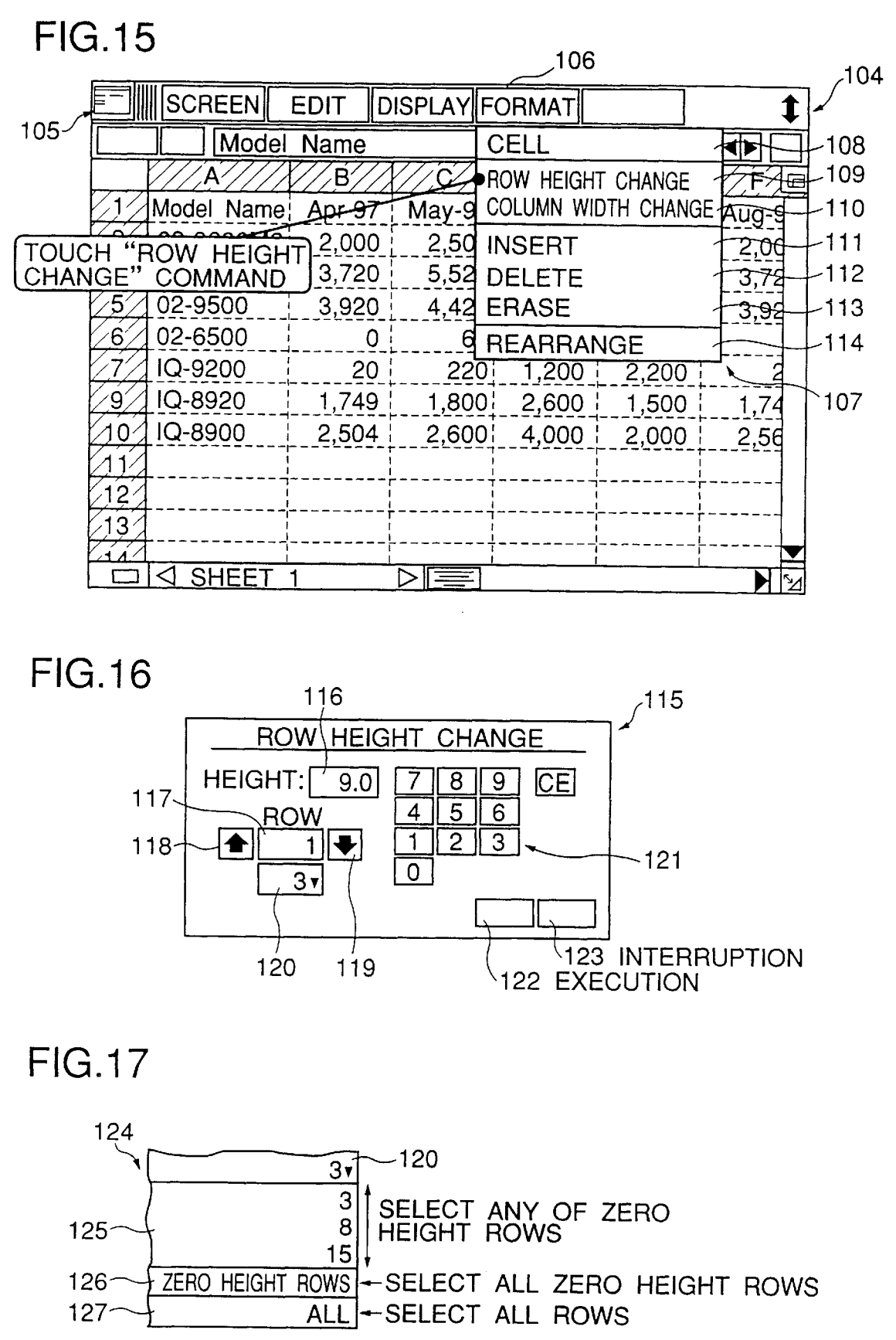

FIG. 15 is a diagram illustrating a screen image 104 which is displayed when implementation of a row recovery operation is designated for recovery of the rows subjected to the non-display operation in the screen image 103 shown in FIG. 14.

Step S013: A menu bar 105 (the uppermost portion in FIG. 15) is displayed.

Step S014: It is determined whether or not the coordinates inputting section 3 is touched. If so, the process goes to Step S015 to determine a touch area corresponding to coordinates inputted to the coordinates inputting section 3. If not so, the process returns to Step S014.

Step S015: If it is determined that the inputted coordinates belong to a touch area located above a format button 106 in the menu bar 105, the process goes to Step S016. If not so, the process goes to Step S022 and, upon completion of some other operation, the process returns to Step S001.

Step S016: A format screen image 107 is displayed on the display screen.

Step S107: It is judged whether or not the coordinates inputting section 3 is touched. If so, the process goes to Step S018, and then a touch area corresponding to coordinates inputted to the coordinates inputting section 3 is determined. If not so, the process returns to Step S017.

Step S018: A format screen image 107 is erased.

Step S019: If it is determined that the inputted coordinates belong to a touch area located above a "ROW HEIGHT CHANGE" command 109, the process goes to Step S020.

Step S020: A row height changing operation is performed and, upon completion of the operation, the process returns to Step S001. The row height changing operation will be described in detail later with reference to a flow chart shown in FIG. 11.

If it is determined in Step S019 that the inputted coordinates belong to a touch area located above a "COLUMN WIDTH CHANGE" command 110, the process goes to Step S021. If it is determined that the inputted coordinates belong to any other touch areas, the process goes to Step S022.

Step S021: A column width changing operation is performed and, upon completion of the operation, the process returns to Step S001. The column width changing operation will be described in detail later with reference to a flow chart shown in FIG. 12.

Step S022: Upon completion of some other operation, the process returns to Step S001.

Figure 11:
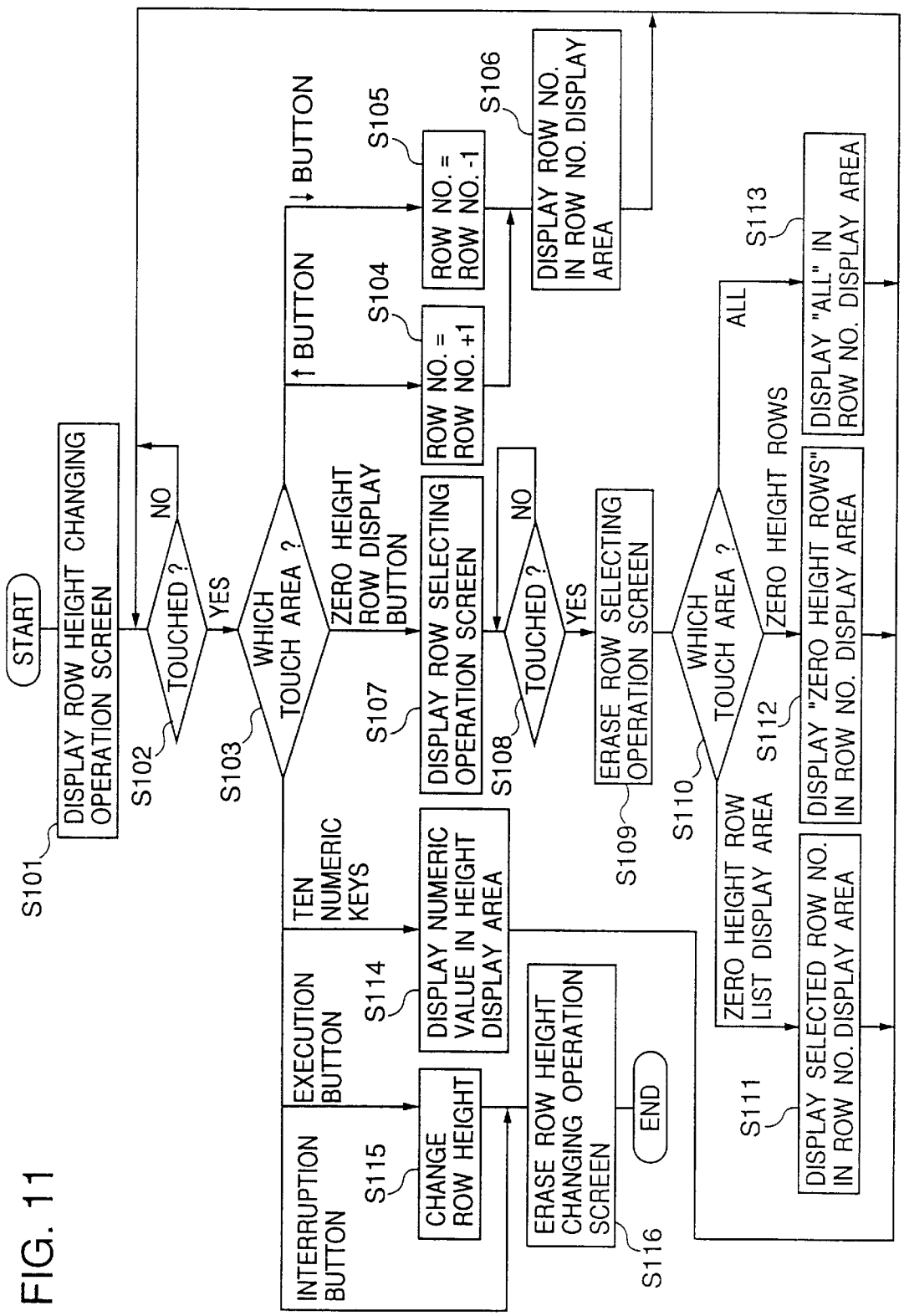
FIG. 11 is a flow chart of a row height changing operation according to the embodiment.

FIG. 11 is a flow chart of the row height changing operation according to this embodiment.

Step S101: A row height changing operation screen 115 (see FIG. 16) is displayed.

FIG. 16 is a diagram illustrating the row height changing operation screen 115 according to this embodiment. Referring to FIG. 16, the row height changing operation screen 115 includes ten numeric keys 121 for inputting numerals, a row height display area 116 on which a numeric value inputted for the row height with the use of the ten numeric keys 121 is displayed, a row number display area 117 on which the number of a row whose height is to be changed is displayed, a "↑" button 118 for incrementing the row number by one, a "↓" button 119 for decrementing the row number by one, a row designation button 120 for designating a row having a height of zero, an execution button 122 for executing the row height changing operation on the row specified by the number displayed in the row number display area 117, and an interruption button 123 for interrupting the row height changing operation.

The row height displayed in the row height display area 116 is a height specified by row data extracted from an area of the row and column data section 59 with reference to the row number displayed in the row number display area 117.

The row number displayed on the row designation button 120 is the first one of the row numbers stored in the row non-display data section 41.

Step S102: The position detecting section 21 judges whether or not the coordinates inputting section 3 is touched. If so, the process goes to Step S103 to determine a touch area. If not so, the process returns to Step S102.

Step S103: If it is determined that the touched area corresponds to a touch area located above the "↑" button 118, the process goes to Step S104.

Step S104: The row number displayed in the row number display area 117 is incremented by one.

Step S106: The incremented row number is displayed in the row number display area 117, and the process returns to Step S102.

If it is determined in Step S103 that the touched area corresponds to a touch area located above the "↓" button 119, the process goes to Step S105.

Step S105: The row number displayed in the row number display area 117 is decremented by one, and the process goes to Step S106.

Any desired row numbers can be selected by repeating the process sequence from Step S102 to Step S106.

The row number selecting operation can be performed regardless of the numeric value of the row height. Therefore, even if the height of a row is zero, the number of the row can be displayed in the row number display area 117 for designation thereof.

If it is determined in Step S103 that the touched area corresponds to a touch area located above the row designation button 120 for designating a row having a height of zero, the process goes to Step S107.

Step S107: A row selecting operation screen 124 (see FIG. 17) is displayed.

FIG. 17 is a diagram illustrating the row selecting operation screen 124 according to this embodiment. Referring to FIG. 17, the row selecting operation screen 124 includes a zero height row list display area 125 on which the numbers of rows having a height of zero are all listed for designation of any of the listed row numbers to change the height of the designated row, a zero height row display area 126 which is to be pointed when all the rows having a height of zero are to be selected for changing the heights thereof, and an ALL display area 127 which is to be pointed when all rows are to be selected for changing the heights thereof.

The display controlling section 23 reads out all the row numbers stored in the row non-display data section 41, and stores the read row numbers in the list buffer 93. Then, the row numbers are displayed in the zero height row list display area 125 in the row selecting operation screen 124 shown in FIG. 17.

Step S108: The position detecting section 21 judges whether or not the coordinates inputting section 3 is touched. If so, the process goes to Step S109, and then a touch area is determined. If not so, the process returns to Step S108.

Step S109: The row selecting operation screen 124 is erased.

Step S110: If it is determined that the touched area corresponds to a touch area located above the zero height row list display area 125, the process goes to Step S111. A list of the zero height row numbers stored in the row non-display data section 41 is displayed in the zero height row list display area 125, and one of the zero height row numbers is selected from the list.

Step S111: The selected row number is displayed in the row number display area 117 (see FIG. 16).

If it is determined in Step S110 that the touched area corresponds to a touch area located above the zero height row display area 126, the process goes to Step S112. If the zero height row display area 126 is pointed, all the rows having a height of zero are selected. That is, all the row numbers stored in the row non-display data section 41 are selected.

Step S112: A notation "ZERO HEIGHT ROWS" is displayed in the row number display area 117.

If it is determined in Step S110 that the touched area corresponds to a touch area located above the ALL display area 127, the process goes to Step S113. If the ALL display area 127 is pointed, all the rows are selected.

Step S113: A notation "ALL" is displayed in the row number display area 117.

Upon completion of the process sequence from Step S111 to Step S113, the process goes to Step S102.

A desired row number can be selected by incrementing or decrementing the row number one by one through the process sequence from Step S102 to Step S106, or by selecting one of the zero height row numbers in the list through the process sequence from Step S102 to Step S111.

Figure 18:
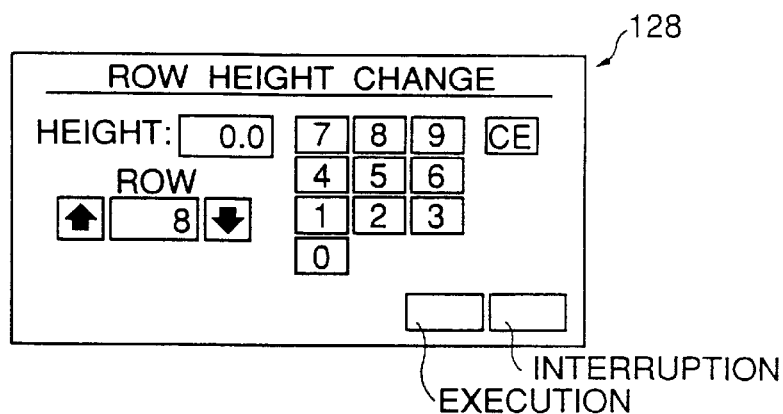
FIG. 18 is a diagram illustrating a row height changing operation screen 128 which is displayed when a row No. 8 is selected in accordance with the embodiment.

FIG. 18 is a diagram illustrating a row height changing operation screen 128 which is displayed when a row No. 8 is selected in accordance with this embodiment. Referring to FIG. 18, the row No. 8 has a height of zero and, therefore, "0.0" is displayed in the row height display area 116.

If it is determined in Step S103 that the touched area corresponds to a touch area located above any of the ten numeric keys 121, the process goes to Step S114.

Step S114: A numeral inputted from the corresponding numeric key 121 is displayed in the row height display area 116. A height of 6.0 is herein inputted.

Figure 19:
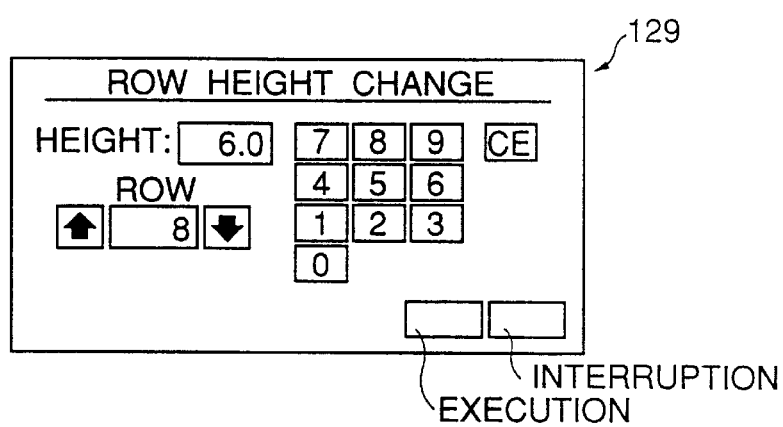
FIG. 19 is a diagram illustrating a row height changing operation screen 129 which is displayed when a numeric value "8.0" is inputted as the height of the row in a display area 116 shown in FIG. 18.

FIG. 19 is a diagram illustrating a row height changing operation screen 129 which is displayed when "6.0" is inputted as the height of the row in the row height display area 116.

Referred again to FIG. 11, if it is determined in Step S103 that the touched area corresponds to a touch area located above the execution button 122, the process goes to Step S115.

Step S115: The row height changing operation is performed. More specifically, the numeric value of the row height stored in the row and column data section 59 is changed to the numeric value inputted in Step S114. If the row height is changed to a numeric value other than zero at this time, the row number is deleted from the row non-display data section 41.

On the basis of the data thus changed, the display controlling section 23 controls the display section 2 to display a spreadsheet modified by changing the row height on the display screen thereof.

The explanation has been given to a specific case where the height of the row No. 8 is changed. If all the zero height row numbers are selected in Step S110, the corresponding row height data in the row and column data section 59 are changed to the numeric value inputted in Step S114 with reference to the row numbers stored in the row non-display data section 41.

On the basis of the data thus changed, the display controlling section 12 controls the display section 2 to display a spreadsheet modified by changing the heights of all the zero height rows on the display screen thereof.

Similarly, if "ALL" is displayed in the row number display area 117 or all the rows stored in the row and column data section 59 are selected in Step S113, the heights of all the rows are changed to the numeric value inputted in Step S114.

On the basis of the data thus changed, the display controlling section 23 controls the display section 2 to display a spreadsheet modified by changing the heights of all the rows on the display screen thereof.

Upon completion of Step S115, the process goes to Step S116. If it is determined in Step S103 that the touched area correspond to a touch area located above the interruption button 123, the process goes to Step S116.

Step S116: The row height changing operation screen 115 is erased, and the process ends.

Through the aforesaid operation, a row subjected to the non-display operation by dragging and dropping a grid line of the row can be recovered to be displayed in the original position.

Figure 12:
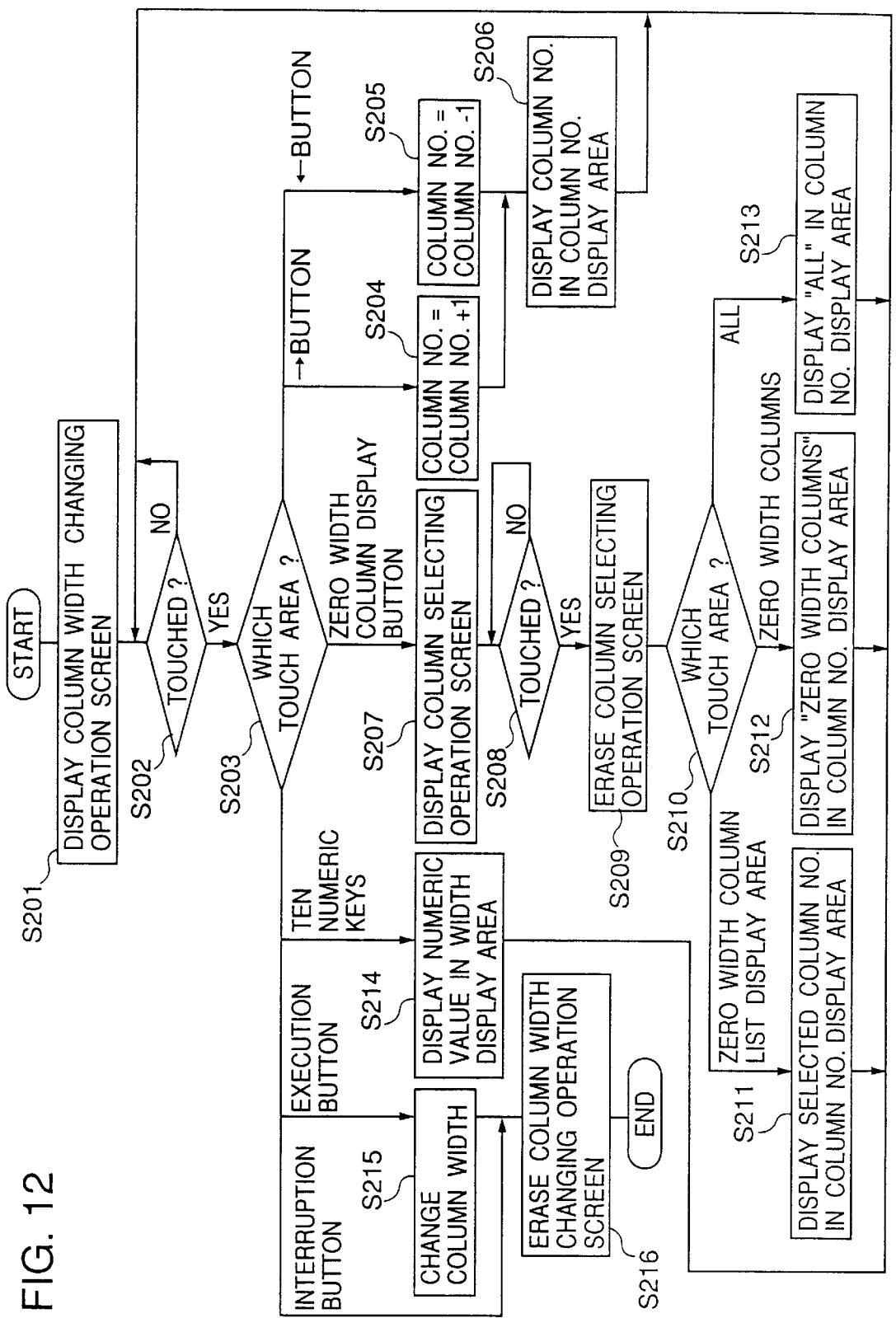
FIG. 12 is a flow chart of a column width changing operation according to the embodiment.

FIG. 12 is a flow chart of the column width changing operation according to this embodiment.

Step S201: A column width changing operation screen 130 (see FIG. 20) is displayed.

Figure 20:
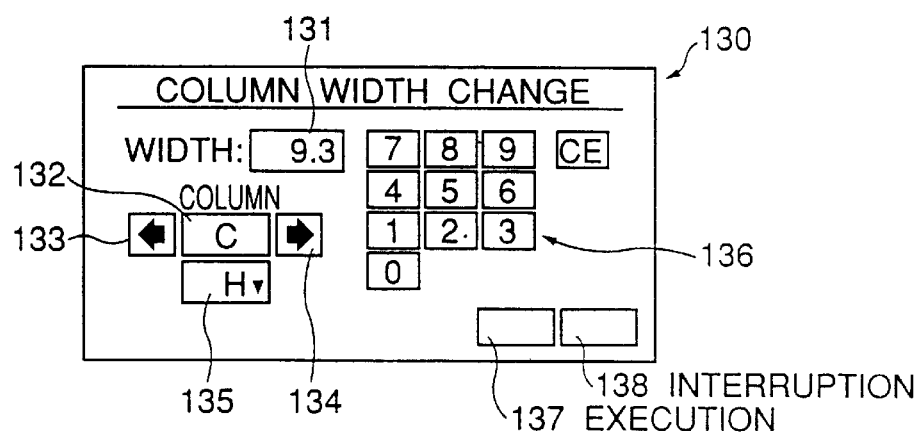
FIG. 20 is an explanatory diagram illustrating a column width changing operation screen 130 according to the embodiment.

FIG. 20 is an explanatory diagram illustrating the column width changing operation screen 130 according to this embodiment. Referring to FIG. 20, the column width changing operation screen 130 includes ten numeric keys 136, a column width display area 131 on which a numeric value inputted for the column width with the use of the ten numeric keys 136 is displayed, a column number display area 132 on which the number of a column whose width is to be changed is displayed, a "→" button 134 for incrementing the column number by one, a "←" button 133 for decrementing the column number by one, a column designation button 135 for designating a column having a width of zero, an execution button 137 for executing the column width changing operation on the column specified by the number displayed in the column number display area 132, and an interruption button 138 for interrupting the column width changing operation.

The column width displayed in the column width display area 131 is a width specified by column data extracted from an area of the row and column data section 59 with reference to the column number displayed in the column number display area 132.

The column number displayed on the column designation button 135 is the first one of the column numbers stored in the column non-display data section 40.

Step S202: The position detecting section 21 judges whether or not the coordinates inputting section 3 is touched. If so, the process goes to Step S203 and a touch area is determined. If not so, the process returns to Step S202.

Step S203: If it is determined that the touched area corresponds to a touch area located above the "→" button 134, the process goes to Step S204.

Step S204: The column number displayed in the column number display area 132 is incremented by one.

It is noted that column numbers are herein represented as "A", "B", "C", . . . in the screen image 100 shown in FIG. 13, and "A", "B", . . . are incremented by one to "B", "C", . . . , respectively, so that the following column is designated through the incrementation.

Step S206: The incremented column number is displayed in the column number display area 132, and the process returns to Step S202.

If it is determined in Step S203 that the touched area corresponds to a touch area located above the "←" button 133, the process goes to Step S205.

Step S205: The column number displayed in the column number display area 132 is decremented by one, and the process goes to Step S206.

It is noted that "B", "C", . . . are decremented by one to "A", "B", . . . , respectively, so that the preceding column is designated through the decrementation.

Any desired column number can be selected by repeating the process sequence from Step S202 to Step S206.

The column number selecting operation can be performed regardless of the numeric value of the column width. Therefore, even if the width of a column is zero, the number of the column can be displayed in the column number display area 132 for designation thereof.

If it is determined in Step S203 that the touched area corresponds to a touch area located above the column designation button 135 for designating a column having a width of zero, the process goes to Step S207.

Step S207: A column selecting operation screen is displayed.

Though not shown, the column selecting operation screen is substantially the same as the row selecting operation screen 124 in FIG. 17. The column selecting operation screen includes a zero width column list display area (corresponding to the zero height row list display area 125) on which the numbers of columns having a width of zero are all listed for designation of any of the listed column numbers to change the width of the designated column, a zero width column display area (corresponding to the zero height row display area 126) which is to be pointed when all the columns having a width of zero are to be selected for changing the widths thereof, and an ALL display area (corresponding to the ALL display area 127) which is to be pointed when all columns are to be selected for changing the widths thereof.

The display controlling section 23 reads out all the column numbers stored in the column non-display data section 40, and stores the read column numbers in the list buffer 93. Then, the column numbers are displayed in the zero width column list display area.

Step S208: The position detecting section 21 judges whether or not the coordinates inputting section 3 is touched. If so, the process goes to Step S209, and then a touch area is determined. If not so, the process returns to Step S208.

Step S209: The column selecting operation screen is erased.

Step S210: If it is determined that the touched area corresponds to a touch area located above the zero width column list display area, the process goes to Step S211. A list of the zero width column numbers stored in the column non-display data section 40 is displayed in the zero width column list display area, and one of the zero width column numbers is selected from the list.

Step S211: The selected column number is displayed in the column number display area 132.

If it is determined in Step S210 that the touched area corresponds to a touch area located above the zero width column display area, the process goes to Step S212. If the zero width column display area is pointed, all the columns having a width of zero are selected. That is, all the column numbers stored in the column non-display data section 40 are selected.

Step S212: A notation "ZERO WIDTH COLUMNS" is displayed in the column number display area 132.

If it is determined in Step S210 that the touched area corresponds to a touch area located above the ALL display area, the process goes to Step S213. If the ALL display area 127 is pointed, all the columns are selected.

Step S213: A notation of "ALL" is displayed in the column number display area 132.

Upon completion of the process sequence from Step S211 to Step S213, the process goes to Step S202.

If it is determined in Step S203 that the touched area corresponds to a touch area located above any of the ten numeric keys 136, the process goes to Step S214.

Step S214: A numeral inputted from the corresponding numeric key 136 is displayed in the column with display area 136.

If it is determined in Step S203 that the touched area corresponds to a touch area located above the execution button 137, the process goes to Step S215.

Step S215: The column width changing operation is performed. More specifically, the numeric value of the column width stored in the row and column data section 59 is changed to the numeric value inputted in Step S214. If the column width is changed to a value other than zero at this time, the column number is deleted from the column non-display data section 40. On the basis of the data thus changed, the display controlling section 23 controls the display section 2 to display a spreadsheet modified by changing the column width on the display screen.

Upon completion of Step S215, the process goes to Step S216. If it is determined in Step S203 that the touched area correspond to a touch area located above the interruption button 138, the process goes to Step 2216.

Step S216: The column width changing operation screen 130 is erased, and the process ends.

Even if the height of a row or the width of a column is reduced to zero so that a grid line of the row or column cannot be dragged and dropped, the row height or the column width can readily be restored through the operations described above by listing the numbers of zero height rows or zero width columns and designating any desired row number or column number.

In accordance with the present invention, even if a created spreadsheet is larger than a display area of a display screen, desired portions of the spreadsheet can be displayed on the display screen by bringing the desired spreadsheet portions into an adjoining relation. At this time, data of a designated row or column are subjected to the non-display operation to bring the desired spreadsheet portions into an adjoining relation. Therefore, there is no need to provide a temporary buffer which may otherwise be required for read-in and read-out of data on a row or column not displayed. This shortens the data processing time for re-displaying a modified spreadsheet and does not require a greater memory capacity.

What is claimed is:

1. A data processing apparatus comprising:
   a spreadsheet data storing section for storing spreadsheet data to be displayed in tabular form;
   a spreadsheet creating section for creating an original spreadsheet consisting of at least one row and at least one column from said stored spreadsheet data, wherein area of said at least one row and column is enclosed by a plurality of grid lines forming a frame;

a display section for displaying said spreadsheet on a display screen;

an inputting section for designating a row or column of said spreadsheet to be subjected to a non-display operation so as not to be displayed on said display screen by dragging and dropping the grid line of said row or column;

a non-display controlling section for subjecting data of the designated row or column to said non-display operation by setting the height of the designated row or the width of the designated column to zero, and for controlling said display section to display a modified spreadsheet by moving rows or columns previously located adjacent to said row or column subjected to said non-display operation into adjoining relation;

a list buffer for storing a list of the number of rows and a list of the number of columns indicative of positions of rows and columns subjected to said non-display operation; and a recovery display controlling section for controlling said display section to display, when said inputting section designates implementation of a recovery display operation, the list of the number of rows and the list of the number of columns on the display section by retrieving the lists of the numbers of rows and columns from the list buffer, and to display a spreadsheet in which data of a row number or column number selected by said inputting section is restored.

2. A data processing apparatus according to claim 1, wherein, when a row or column to be subjected to said recovery display operation and a numeric value for the height of the row or the width of the column are designated by said inputting section, said recovery display controlling section recovers said designated row or column with the height or width thereof being set to said designated numeric value.

3. A computer program embodied on a computer-readable storage medium for controlling a data processing apparatus including a spreadsheet data storing section for storing spreadsheet data to be displayed in tabular form, a spreadsheet creating section for creating an original spreadsheet consisting of at least one row and at least one column, from the stored spreadsheet data, the at least one row and column having a display area enclosed by a plurality of grid lines forming a frame, a display section for displaying the created spreadsheet on a display screen, an inputting section which designates a row or column of the spreadsheet for a non-display operation so as not to be displayed on the display screen, and a list buffer for storing a list of the numbers of rows and columns indicative of positions of the rows and columns subjected to the non-display operation, comprising:

causing a computer operation to subject data of said designated row or column to said non-display operation by dragging and dropping a grid line of said row or column to remove said row or column from said display screen, and to control said display section to display a modified spreadsheet by moving rows or columns previously located adjacent to said removed row or column into adjoining relation;

causing a computer operation to control said display section to display the list of the numbers of rows and columns on the display section by retrieving the lists of the numbers of rows and columns from the list buffer, and to display the original spreadsheet by restoring data of said previously removed row or column when said inputting section designates implementation of a recovery display operation.

4. A method for data processing in an electronic device, comprising:

storing spreadsheet data for display on a screen in tabular form;

creating an original spreadsheet for display on said screen from said stored spreadsheet data, said displayed spreadsheet including a plurality of rows and columns, wherein an area of each row or column is enclosed by grid lines forming a frame;

designating at least one row or column from said plurality of rows and columns for a non-display operation by dragging and dropping the grid line of said row or column;

storing a list of the numbers of rows and columns indicative of positions of the rows and columns subjected to said non-display operation; and displaying a modified spreadsheet having rows and columns previously located adjacent to said removed row or column displayed in adjoining fashion, thereby obviating a need for a temporary buffer which is otherwise required for read-out of data in a non-displayed row or column.

5. The method of claim 4, further including:

restoring data of said removed row or column in a recovery display operation; and displaying said original spreadsheet with said restored data of said previously removed row or column, thereby obviating a need for a temporary buffer which is otherwise required for read-in of data in a non-displayed row or column.

6. The method of claim 4, said step of dropping and dragging in said non-display operation further including setting the height of a designated row to zero.

7. The method of claim 4, said step of dropping and dragging in said non-display operation further including setting the width of a designated column to zero.

8. The method of claim 4, further including:

designating a row or column removed in said dragging and dropping step and a numeric value for the height of said designated row or the width of said designated column for a recovery display operation; and recovering said designated row or column on said screen, said height or width thereof set at said numeric value.

9. A data processing apparatus, comprising:

a display screen for displaying data of a spreadsheet consisting of a plurality of displayed rows and columns, wherein area within each of said rows and columns is bounded by a plurality of grid lines forming a frame;

an inputting section for designating at least one of said plurality of columns and rows for a non-display operation which removes said designated row or column from said display screen by dropping and dragging a grid line thereof, a list buffer for storing a list of the number of rows and a list of the number of columns indicative of positions of rows and columns subjected to said non-display operation;

said display screen displaying a modified spreadsheet by moving rows and columns previously adjacent to said removed row or column together in adjoining relation; and a recovery section for recovering a row or column removed from said display and for retrieving the lists of the numbers of rows and columns from the list buffer upon a command from said inputting section, thereby displaying said lists and said spreadsheet in its original form.

10. The data processing apparatus according to claim 9, wherein data from a row removed in said non-display operation is stored in a row non-display data section.

11. The data processing apparatus according to claim 9, wherein data from a column removed in said non-display operation is stored in a column non-display data section.

12. The data processing apparatus according to claim 9, wherein said row or column designated for removal has its row height or column width reduced to zero in a row height/column width changing section.

13. The data processing apparatus according to claim 9, said display screen further including:

a row height changing operation screen for adjusting row height; and a row selecting operation screen for selecting at least one of a plurality of rows previously designated for removal, wherein commands input at said inputting section by a user enable said row height changing and said row selecting operation screens to be displayed for restoring a row previously removed by dragging and dropping to said displayed spreadsheet.

14. The data processing apparatus according to claim 9, said display screen further including:

a column width changing operation screen for adjusting row height; and a column selecting operation screen for selecting at least one of a plurality of columns previously designated for removal, wherein command input at said inputting section enable said column width changing and said column selecting operation screens to be displayed for restoring a column previously removed by dragging and dropping to said displayed spreadsheet.

15. A data processing apparatus comprising:

a spreadsheet data storing section for storing spreadsheet data to be displayed in tabular form;

a spreadsheet creating section for creating an original spreadsheet consisting of at least one row and at least one column from said stored spreadsheet data, wherein area of said at least one row and column is enclosed by a plurality of grid lines forming a frame;

a display section for displaying said spreadsheet on a display screen;

an inputting section for designating a row or column of said spreadsheet to be subjected to a non-display operation so as not to be displayed on said display screen;

a non-display controlling section for subjecting data of the designated row or column to said non-display operation by setting the height of said designated row or the width of said designated column to zero to remove said designated row or column from said display screen, and for controlling said display section to display a modified spreadsheet by moving rows or columns previously located adjacent to said row or column subjected to said non-display operation into adjoining relation; and a list buffer for storing a list of the number of rows and a list of the number of columns indicative of positions of rows and columns subjected to said non-display operation;

a recovery display controlling section for controlling said display section to display said lists by retrieving the lists of rows and columns from said list buffer, and to display said original spreadsheet by restoring data of said row or column subjected to said non-display operation, when said inputting section designates implementation of a recovery display operation.

\* \* \* \* \*